(12) United States Patent
Gerchberg

(10) Patent No.: US 6,906,839 B2
(45) Date of Patent: *Jun. 14, 2005

(54) SYSTEM AND METHOD FOR RECOVERING PHASE INFORMATION OF A WAVE FRONT

(76) Inventor: Ralph W. Gerchberg, 20 Kensington Rd., Ardsley, NY (US) 10502

( * ) Notice: Subject to any disclaimer, the term of this patent is extended or adjusted under 35 U.S.C. 154(b) by 0 days.

This patent is subject to a terminal disclaimer.

(21) Appl. No.: 10/408,488

(22) Filed: Apr. 7, 2003

(65) Prior Publication Data

US 2003/0202634 A1 Oct. 30, 2003

Related U.S. Application Data

(60) Division of application No. 09/858,943, filed on May 16, 2001, now Pat. No. 6,545,790, which is a continuation-in-part of application No. 09/708,290, filed on Nov. 8, 2000, now Pat. No. 6,369,932.
(60) Provisional application No. 60/163,978, filed on Nov. 8, 1999.

(51) Int. Cl.$^7$ .............................. G02F 1/00; G02F 1/01; G02F 1/29; G02B 27/42
(52) U.S. Cl. ....................... 359/237; 359/279; 359/299; 359/300; 250/550
(58) Field of Search ................................ 359/237, 279, 359/299, 300, 559; 250/550

(56) References Cited

U.S. PATENT DOCUMENTS

| 4,330,775 A | 5/1982 | Iwamoto et al. ......... 340/146.3 |
| 4,953,188 A | 8/1990 | Siegel et al. ................... 378/43 |
| 5,426,521 A | 6/1995 | Chen et al. ..................... 359/9 |
| 6,222,986 B1 | 4/2001 | Inuiya ......................... 386/117 |
| 6,289,235 B1 | 9/2001 | Webber et al. .............. 600/426 |
| 6,412,087 B1 | 6/2002 | Matsumoto ................. 714/738 |

*Primary Examiner*—Timothy Thompson
(74) *Attorney, Agent, or Firm*—Jones Day

(57) ABSTRACT

A system and method for recovery of phase information from recorded intensity values is disclosed. In one aspect, a phase filter is placed in a plane, which may be the back focal plane (BFP) of a lens used for observing an object. The phase filter changes the phase of a wave front distribution in the BFP in a known manner. Amplitude stops or combinations of phase and amplitude filtering patterns can also be used to capture N different sets of intensity data in a conjugate diffraction plane. The N intensity images are used to obtain an estimate of the wave front at the first plane. This wave front estimate is then used to generate N modified estimates of the wave front at the conjugate plane, each modified estimate corresponding to one of N filtering patterns. In one implementation, the N modified IP estimates are corrected by replacing the estimated amplitudes with the actually measured ones for that image. The process is repeated iteratively until an error measure between the measured values and the synthetically generated ones falls below a known threshold. The resulting phase estimates can be used to display wave front information similar in appearance to holograms, or to create lens-free microscopes.

16 Claims, 23 Drawing Sheets

SYSTEM AND METHOD FOR RECOVERING PHASE INFORMATION OF A WAVE FRONT

This is a division of Ser. No. 09/858,943 filed on May 16, 2001 now U.S. Pat. No. 6,545,790, which is a continuation-in-part of application Ser. No. 09/708,290 filed Nov. 8, 2000 now U.S. Pat. No. 6,369,932, which converted from provisional application No. 60/163,978, filed Nov. 8, 1999.

FIELD OF THE INVENTION

The present invention is generally directed to a system and method for recovering wave front phase information and using the recovered information. More particularly, the invention is directed to a system and method for determining the phase information associated with a wave front from measured intensity information.

BACKGROUND OF THE INVENTION

Huygens, Kirchhoff, Sommerfield and Rayleigh originated and contributed most to the currently accepted theory of diffraction, which forms the theoretical foundation for the present invention. Basically, the theory postulates that given a known wave front filling a planar window in an otherwise dark planar screen, the wave front at any point beyond the screen is calculable. Variations of this theory are used to compute the Fraunhofer far-field antenna pattern assuming a known field distribution at the antenna for electromagnetic wave fronts in the microwave range. An ordinary light camera, assuming a sufficiently coherent and pseudo monochromatic light wave, contains the Back Focal Plane (BFP) of the camera's objective lens as the illuminating window of the diffraction theory, and the imaging plane as the plane at which the image could be calculated. Of course, in the case of the camera, photographic film or electronic sensing devices are placed in the image plane, recording the intensity of the wave and no calculations need be made. However, it will be appreciated that at each point in a wave front there is more than just the intensity of the wave—there is the phase of the wave which may contain as much as eighty percent of the information about the object which is being imaged. To appreciate this fact more fully, it is only necessary to recall the potential of the conventional holograms to image objects in three dimensions. In particular, using phase information about a coherent wave front, holography creates three-dimensional images such that obscured objects may become visible if the observer steps to the side. So, the problem addressed using this invention can be stated as follows: given that a wave front is a complex function characterized by both amplitude (related in a straightforward manner to intensity) and phase at each point, how can the phase be captured using only intensity measurements.

To appreciate the complexity of the problem, consider the following observation: at a given instant of time, the phase of a wave length is about 6.28 radians. For red light, the length over which that phase is generated is about 0.6 microns. Considering that light travels at approximately 300,000,000 meters per second, that means that the frequency of such a wave passing a point in space is about $3.1*10^{15}$ radians/second. No device exists that has that kind of response time. For the ordinary light camera, the two planes of interest relating to diffraction theory are the BFP of the lens and the image plane. They have been shown to be conjugate planes in the sense that the wave front in the image plane is essentially the Fourier Transform of the illuminating wave in the BFP.

In a coherent monochromatic imaging system the problem of extracting phase information from a detection medium which records only intensity information remains a problem without a consistent solution. Several experimental methods have been proposed for determining the phase function across a wave front. One such method disclosed in Gabor, D. "A New Microscope Principle," Nature 161, 777 (1948) involves the addition of a reference wave to the wave of interest in the recording plane. The resulting hologram records a series of intensity fringes, on a photographic plate, which contain enough information to reconstruct the complete wave function of interest. However, in most practical applications this method is cumbersome and impractical to employ.

Other methods, which do not employ reference waves, have been proposed for inferring the complete wave function from intensity recordings. See, e.g., Erickson, H. & Klug, A. "The Fourier Transform of an Electron Micrograph: Effects of Defocusing and Aberrations, and Implications for the use of Underfocus Contrast Enhancements", Berichte der Bunsen Gesellschaft, Bd. 74, Nr. 11, 1129–1137 (1970). For the most part, these methods involve linear approximation and thus are only valid for small phase and/or amplitude deviations across the wave front of interest. In general, these methods also suffer from the drawback of requiring intensive computational resources.

A further method proposed that intensity recordings of wave fronts can be made conveniently in both the imaging and diffraction planes. Gerchberg, R. & Saxton, W. "Phase Determination from Image and Diffraction Plane Pictures in the Electron Microscope," Optik, Vol. 34, No. 3, pp. 275–284 (1971). The method uses sets of quadratic equations that define the wave function across the wave in terms of its intensity in the image and diffraction planes. This method of analysis is not limited by the above-described deficiency of being valid for small phase or amplitude deviations, but again, in general it requires a large amount of computational resources.

In 1971 the present inventor co-authored a paper describing a computational method for determining the complete wave function (amplitudes and phases) from intensity recordings in the imaging and diffraction planes. See, "A Practical Algorithm for the Determination of Phase from Image and Diffraction Plane Pictures," Cavendish Laboratory, Cambridge, England, Optik, Vol. 35, No. 2, (1972) pp. 237–246, which is incorporated herein by reference for background. The method depends on there being a Fourier Transform relation between the complex wave functions in these two planes. This method has proven to have useful applications in electron microscopy, ordinary light photography and crystallography where only an x-ray diffraction pattern may be measured.

The so-called Gerchberg-Saxton solution is depicted in a block diagram form in FIG. 1. The input data to the algorithm are the square roots of the physically sampled wave function intensities in the image 100 and diffraction 110 planes. Although instruments can only physically measure intensities, the amplitudes of the complex wave functions are directly proportional to the square roots of the measured intensities. A random number generator is used to generate an array of random numbers 120 between π and –π, which serve as the initial estimates of the phases corresponding to the sampled imaged amplitudes. If a better phase estimate is in hand a priori, that may be used instead. In step 130 of the algorithm, the estimated phases 120 (represented as unit amplitude "phasors") are then multiplied by the corresponding sampled image amplitudes from the image plane, and the Discrete Fourier Transform of the synthesized complex discrete function is accomplished in step 140 by means of the Fast Fourier Transform (FFT) algorithm. The phases of the discrete complex function resulting from this transformation are retained as unit amplitude "phasors" (step 150), which are then multiplied by the true corresponding sampled diffraction plane amplitudes in step 160. This discrete complex function (an estimate of the complex diffraction plane wave) is then inverse Fast Fourier transformed in step 170. Again the phases of the discrete complex function generated are retained as unit amplitude "phasors" (step 180), which are then multiplied by the corresponding measured image amplitudes to form the new estimate of the complex wave function in the image plane 130. The sequence of steps 130–180 is then repeated until the computed amplitudes of the wave forms match the measured amplitudes sufficiently closely. This can be measured by using a fraction whose numerator is the sum over all sample points in either plane of the difference between the measured and computed amplitudes of the complex discrete wave function squared and whose denominator is the sum over all points in the plane of the measured amplitudes squared. When this fraction is less than 0.01 the function is usually well in hand. This fraction is often described as the sum of the squared error (SSE) divided by the measured energy of the wave function: SSE/Energy. The fraction is known as the Fractional Error.

A theoretical constraint on the above described Gerchberg-Saxton process is that the sum squared error (SSE), and hence the Fractional Error, must decrease or at worst remain constant with each iteration of the process.

Although the Gerchberg-Saxton solution has been widely used in many different contexts, a major problem has been that the algorithm can "lock" rather than decrease to a sum square error (SSE) of zero. That is to say, the error could remain constant and the wave function, which normally develops with each iteration, would cease to change. The fact that the SSE cannot increase may in this way trap the algorithm's progress in an "error well." See Gerchberg, R. "The Lock Problem in the Gerchberg Saxton Algorithm for Phase Retrieval," Optik, 74, 91 (1986), and Fienup, J. & Wackerman, C. "Phase retrieval stagnation problems and solutions," J. Opt. Soc. Am. A, 3, 1897 (1986). All of the above-identified publications are hereby incorporated by reference for background. Another problem with the method became apparent in one dimensional pictures where non-unique solutions appeared. Furthermore, the algorithm suffers from slow convergence. To date, there are no alternative satisfactory solutions to these problems with the Gerchberg-Saxton method. Accordingly, there is a need for a system and method that can recover wave front phase information without the drawbacks associated with the prior art.

SUMMARY OF THE INVENTION

The present invention is driven by an "error reduction" principle and requires a plurality of samples of the wave front from the object being observed. In one aspect, the invention relies on the fact that the back focal plane of a convergent lens on which the scattered wave from the object impinges contains a wave function, which is directly proportional to the Fourier Transform of the object and is therefore directly proportional to the Fourier Transform of the image plane wave function of the object. In the case where the phase difference from one pixel to any of its neighboring pixels only changes slightly, prior art methods were computationally intensive in trying to distinguish between these slight phase differences. Since the actual back focal plane (BFP) wave transforms to the true image in the Image Plane, by the intervention of the drift space between these two planes (mathematically causing the BFP wave to undergo Fourier Transformation yielding the Image Plane wave), in accordance with the invention a very useful relationship is obtained between the measurements in these two conjugate planes. However, other relationships between the waves in these two planes are achievable by changing the phase and/or amplitude distribution in the BFP. In one aspect of the invention, this can be accomplished by using known but physically different phase filters, in the BFP, whose effects on the BFP phase distribution are known. It is noted that there are other physical methods of effectively changing the phase in the BFP (e.g., the use of defocus). The Image Plane wave resulting from this intervention can be very different from the true object wave, consequently yielding new relationships between intensity measurements in these two conjugate planes. The present invention uses several of these new "synthesized" relationships to drastically reduce computation of the reconstructed wave form, to avoid stagnation in the iterating algorithm, and to avoid certain well known ambiguities in the reconstructed wave function.

In one embodiment of the present invention, a random phase filter is inserted into the Back Focal Plane (BFP) of a convergent lens. This phase filter changes the phase for pixels in the BFP in a known way, thereby changing the resulting image in the Image Plane. The phase distribution of the individual pixels in the BFP can be selected randomly, or according to a desired distribution. In alternative embodiments of the invention, conventional convergent and/or divergent lenses can be used as phase filters.

Using the above filter(s), N different sets of amplitude (intensity) data are obtained from the image plane. That is to say, N different images of the object are created in the image plane. It is noted that in an alternative embodiment of the present invention, wave intensities may be recorded in the BFP as well. Next, each of the N intensity images is processed to obtain a "synthetic" wave front using the intensity values measured at the Image Plane and phase values that could be random, or may be selected based on prior knowledge. As a practical matter, any initial phase estimate values will work although, for convenience, initially the phase for each complex pixel can be assumed to be zero. The resulting wave function for each of the N images is then inverse Fourier transformed (using standard fast algorithms), and the known phase shift of each of the corresponding BFP filters is subtracted from each pixel. This is done in turn for each of the N images to obtain N estimates of the wave function at the BFP. The resulting BFP estimates are saved for each of the N images. Then, in accordance with a preferred embodiment these BFP estimates are averaged to obtain a single BFP estimate of the complex BFP wave front.

In an alternative embodiment of the present invention, in which BFP intensity data have been measured along with the N IP images, the amplitude of the BFP wave estimate is changed to the measured amplitude distribution at this point in the iterative process. Then for each of the N IP images, the phase shift of its corresponding filter is added in turn to the single BFP estimate and the N different BFP estimates (differing by the N different phase filter effects) are Fourier transformed to generate N estimates of the wave function at the image plane. Each of the N estimates are then corrected using the actually measured amplitude for that particular image. This correction results in an error value. The above process then is repeated in an iterative fashion until the SSE of all N images is sufficiently small for the purposes of the application. In a typical case, less than 1% of the energy of all N images (i.e., the Fractional Error is less than 1%) can be used.

In another important aspect of the invention, it was discovered that absolute stops placed in the illuminating conjugate plane can also be used with only a slight modification of the processing algorithm to unambiguously recover the phase function of a wave front. The same results can also be accomplished by varying the drift space between the two conjugate planes (one containing the intensity/amplitude of the wave front and the other containing the intensity/amplitude of the Fourier Transform of the wave front). Moreover, lossy phase filters and lossy stops can be used in certain practical applications.

Accordingly, in another aspect of the invention, recovery of the phase information can be accomplished using a set of amplitude filters (hereinafter "stops"). Experiments using stops show that they can be used successfully in addition to or as an alternative to the phase filters discussed above with only small modifications of the processing algorithm. In an important practical application, the use of stops can be applied to build a functioning X-ray microscope.

In another aspect of the invention partial or lossy stops or lossy phase filters, or combination thereof can be used in different embodiments for specific practical applications.

In yet another aspect of the invention, instead of using physical stops or phase filters, the desired set of diffraction images can be created by varying the length of the drift space from the specimen plane. Lens-free microscopes, including an X-ray microscope, can be built in accordance with this embodiment as well.

In particular, in one aspect the invention is a method for recovering phase information of a wave front corresponding to a substantially monochromatic coherent radiation, comprising: (a) irradiating a specimen of material with the substantially monochromatic coherent radiation, the specimen being positioned in a first plane; (b) selectively filtering radiation modulated by the specimen according to N predetermined filtering patterns corresponding to one or more filters, wherein said one or more filters are positioned substantially at the first plane; (c) for each of the N filtering patterns, capturing spatial intensity values for the selectively filtered modulated radiation at a second plane to produce N corresponding intensity distributions, wherein the second plane is a conjugate diffraction plane with respect to the first plane; (d) processing the N intensity distributions captured in the second plane to provide an estimate of the wave front at the first plane, the step of processing comprising correcting the effect of the corresponding filtering patterns; (e) filtering the provided wave front estimate using the N different filtering patterns to obtain N filtered estimates; (f) processing the filtered estimates to produce N estimated intensity distributions at the second plane; and (g) repeating steps (d), (e) and (f) until an error measure associated with the captured and the estimated intensity distributions in the second plane reaches a predetermined threshold. In a preferred embodiment the filtering patterns are phase filtering patterns, amplitude stops or combination thereof. The number of filtering patterns is typically selected dependent on the desired resolution, or can be optimized using information about the underlying wave front. In a specific embodiment, the radiation is X-ray radiation. Further, the method comprises the step of displaying a wave front using recovered phase information.

In another aspect, the invention is an apparatus, comprising: (a) a source of collimated radiation for irradiating a specimen of material positioned in a specimen plane; (b) a plurality of different stops, each one blocking radiation modulated by the irradiated specimen according to a predetermined blocking pattern; (c) one or more sensors capturing for each of the plurality of stops an indication of the intensity distribution of the modulated radiation in a plane that is a conjugate diffraction plane with respect to the specimen plane; and (d) a processor recovering phase information of the wave front of the modulated radiation from the captured intensity distributions and the predetermined blocking patterns imparted by the plurality of stops. In a preferred embodiment the source of radiation is an X-ray source, and the device can be used as an X-ray microscope.

In another aspect, the invention is an apparatus for processing radiation, comprising: (a) a source of collimated radiation for irradiating a specimen positioned in a specimen plane; (b) one or more sensors capturing an indication of the intensity distribution of radiation modulated by the specimen in a plane that is a conjugate diffraction plane with respect to the specimen plane; (c) a motion mechanism changing the distance between the specimen plane and the conjugate diffraction plane, such as to introduce a predetermined phase shift in the modulated radiation; and (d) a processor for recovering phase information of the wave front of the modulated radiation from a plurality of captured intensity distributions obtained using a plurality of predetermined phase shifts introduced by the motion mechanism.

In yet another aspect, the invention is a method for processing substantially monochromatic coherent radiation modulated in a first plane, comprising: (a) capturing N intensity distributions corresponding to the modulated radiation at a second plane, the second plane being conjugate diffraction plane with respect to the first plane, where the captured intensity distributions are obtained by filtering the modulated radiation at the first plane using N different filtering patterns; (b) processing the N intensity distributions captured in the second plane to provide an estimate of the radiation wave front at the first plane, the step of processing comprising correcting the effect of the corresponding filtering patterns; (c) processing the provided estimate of the radiation wave front at the first plane using the N different filtering patterns to compute N estimated intensity distributions in the second plane; (d) computing an error measure corresponding to differences between the captured and the estimated intensity distributions in the second plane; and (e) iteratively repeating steps (b), (c) and (d) until the error measure computed in step (d) drops below a pre-determined threshold.

BRIEF DESCRIPTION OF THE DRAWINGS

The present invention in different preferred embodiments is illustrated and best understood in connection with the drawings, in which.

DETAILED DESCRIPTION OF THE PREFERRED EMBODIMENTS

The present invention generally applies to propagating wave fronts, along whose path of propagation two planes exist in which the complex wave distributions are related by a transform, which generally would be linear, invertible and energy conservative, such as a Fourier transform. These two planes will also be referred to as conjugate planes. Such conjugate planes exist, for example, between an electromagnetic antenna aperture and its far field (Fraunhofer) plane, or between the object plane and the back focal plane of a convergent lens imaging the object plane, or between the back focal plane of a light camera's objective lens and the camera's image plane, or between the diffraction and the image planes of a transmission electron microscope, or between an X-ray illuminated crystal structure and its diffraction plane, and so on. Given that the ability of recording media is limited to recording only the intensity distribution in these planes, the need arises to recover the phase distribution across these planes as well. The wave front is a complex function across a plane comprising intensity/amplitude and phase. In this disclosure, for the purpose of brevity, the two planes are referred to as the back focal plane (BFP) of a light camera and its corresponding image plane (IP). As noted above, the wave front in the image plane is proportional to the Fourier Transform (FT) of the wave in the camera's back focal plane (BFP).

Although one preferred embodiment of the present invention is described in terms of recovering phase information for a wave front in the visible electromagnetic spectrum, the present invention is not so limited and can also be applied to other regions of the spectrum, such as x-ray, infrared, electron microscopy, sonar, etc. Generally, the method is effective in any context in which the scalar wave equation yields a sufficiently accurate picture of the physics of a context. In addition, one needs a physical mechanism of altering the phase and/or amplitude of the wave at the object/diffraction plane in a known way to yield different synthesized intensities in the downstream diffraction/image plane.

Figure 1:
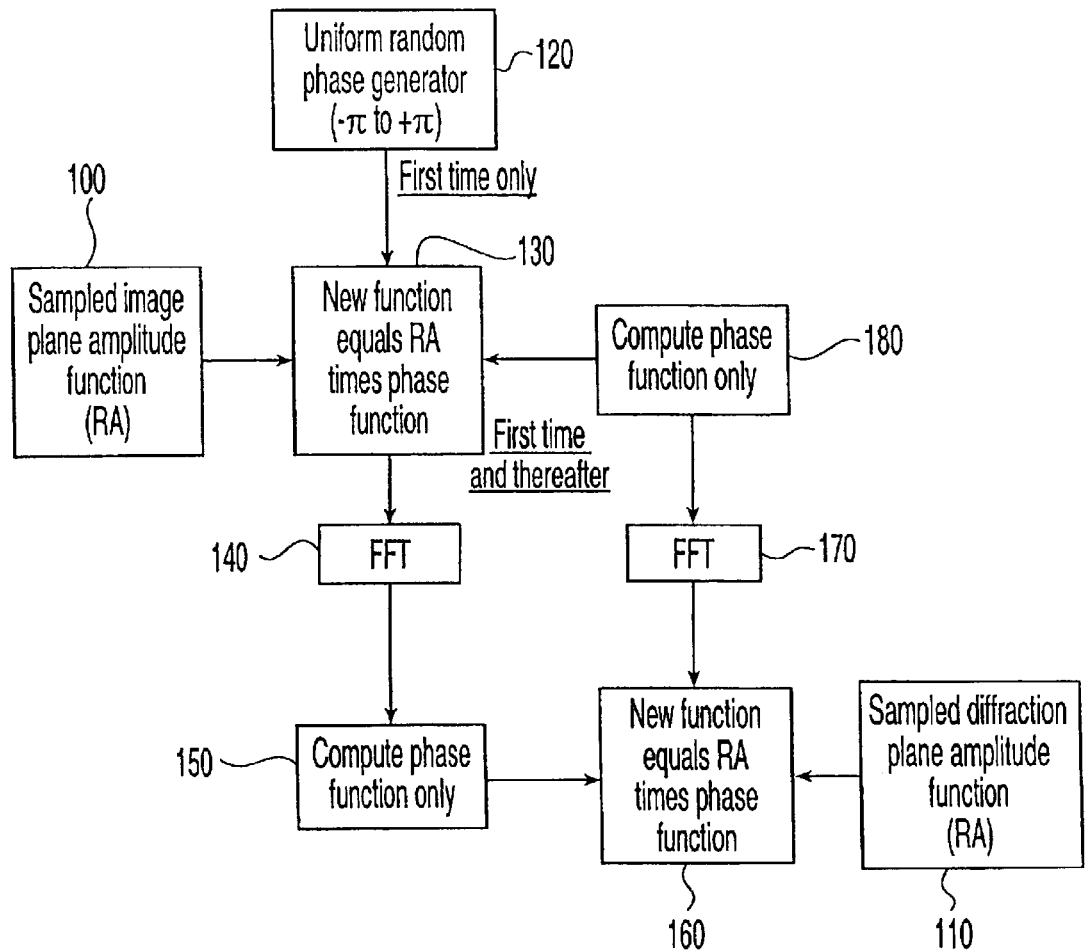
FIG. 1 illustrates a prior art method for recovering phase information.
Figure 2:
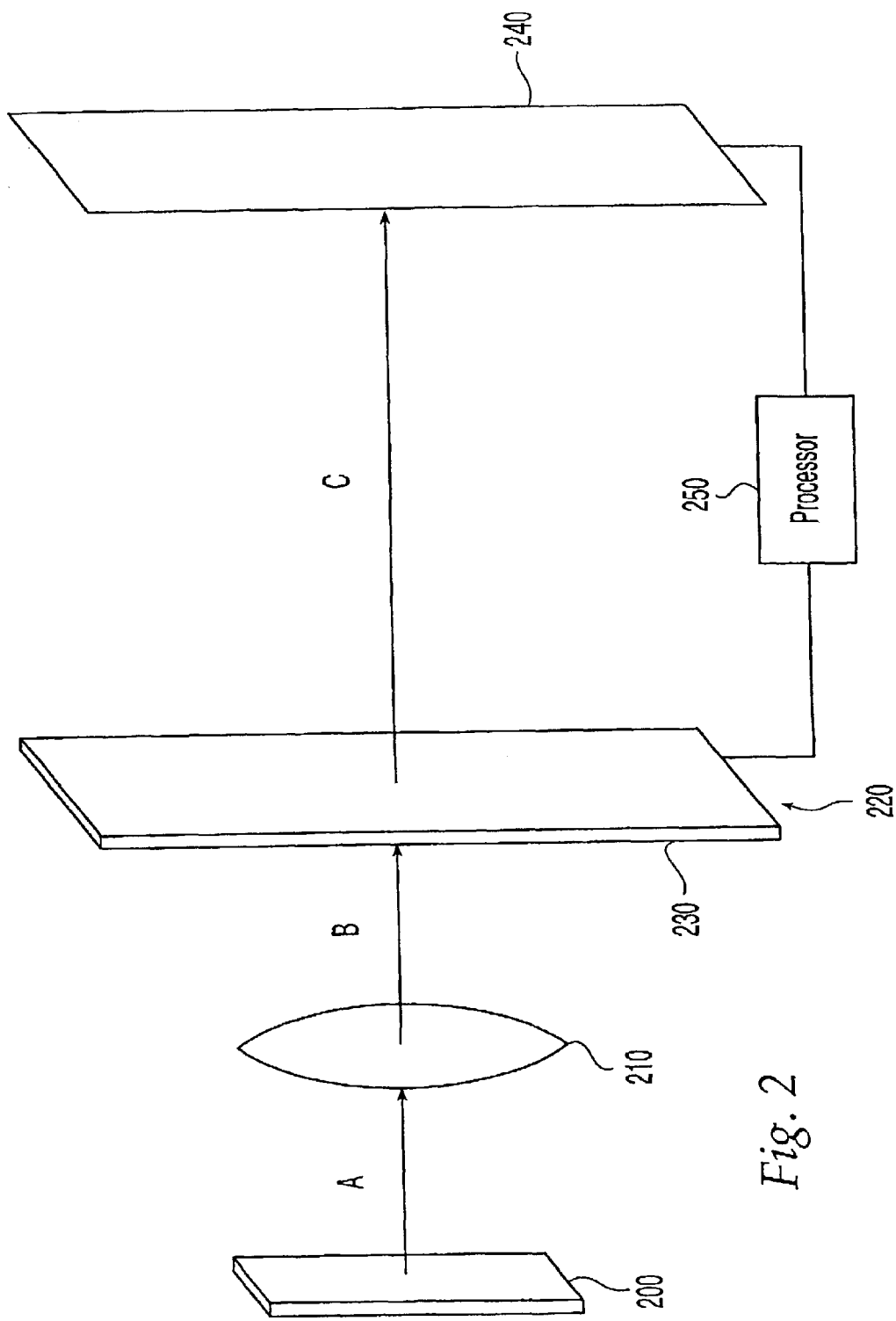
FIG. 2 illustrates an apparatus for obtaining intensity data according to one embodiment of the present invention.

FIG. 2 illustrates an apparatus for obtaining intensity data in accordance with a preferred embodiment of the present invention. Element 200 represents an object which is to be imaged. This object can either be transparent and therefore backlit, or can be illuminated to reflect light. In a preferred embodiment, the light from the object is monochromatic coherent light illustrated in FIG. 2 as ray A. In alternative embodiments of the present invention, as dictated by the specific practical application, instead of a purely monochromatic coherent source, one can use a partially coherent light source, where instead of a point source the system uses a distributed source. (Broadly speaking, light from a distributed source shone through a screen with two holes will generate on a wall behind the screen fringes that are not completely constructive/destructive but become blurred with distance). In another alternative embodiment, one can use a pseudo-monochromatic light source, which emits in a narrow bandwidth. The feasibility of using these alternative-embodiment light sources will be determined by specific applications.

With further reference to FIG. 2, the light A from the object 200 is converged into light B using a lens (or a system of lenses) 210. For example, in the case of visible light, a convergent lens with a convenient focal length would be useful while in the context of electron microscopy, a magnetic lens would be appropriate. What type of lens 210 is used will be determined by the application, the only constraint being that it generates the pair of conjugate BFP and IP planes.

Element 220 in FIG. 2 represents the BFP of the lens 210. A phase filter 230 is placed at the position of the BFP 220 in the illustration in FIG. 2. The complex wave function that forms in the diffraction or BFP 220 is capable of having its intensity captured and recorded in the usual way for the selected medium. For example, in the case of visible light, X-rays or electron beams, exposing photographic film directly to the complex wave is a useful recording technique. A charged coupled device (CCD) array may also be used to capture the image at the BFP 220. Digital recording directly is also appropriate in many applications, as will be recognized by those of skill in the art.

Phase filter element 230 represents one or more phase filters inserted at the BFP 220. Generally, filter 230 is used to generate a plurality of image intensity data required by the present invention. In one embodiment, the phase filter 230 is a random phase plate with uniform distribution. Other random phase filters with other distributions may also be used. The random phase plate 230 randomly changes the phase of a pixel by anything from $-\pi$ to $+\pi$. For example, if the phase of one pixel was 10 degrees and its neighboring pixel had a phase of 11 degrees, after passage through the random phase plate 230, the phases of these two pixels might be −75 degrees and +34 degrees. Although the amount of phase shift experienced by each pixel may be random with respect to its neighboring pixels, in accordance with the present invention the amount of phase shift applied to each of the pixels is a known quantity.

In summary, in one aspect of the invention the light in the BFP 220 is altered by the phase filter 230. This is done on a pixel by pixel basis resulting in no change in the complex wave front amplitude/intensity exiting from the BFP 220, but with possibly considerable change in its "invisible" phase distribution. Then, after passing through the space between the BFP 220 and the image plane 240 (see ray C in FIG. 2), the effect of the phase filter 230 is seen in the recorded intensity image at the image plane 240. The image recorded at the image plane 240 does not resemble the original object 200 because of the phase changes introduced by the phase filter 230. Thus, for example, at the image plane 240 the image of a transparent phase object 200 is not a featureless uniform intensity image. Nor does it necessarily resemble the original phase of the object 200.

It is desirable, though not necessary, that the cross correlation between the different filters 230 used to obtain the plurality of images is between +0.1 and −0.1. In different embodiments of the present invention, conventional optics can also be used as the phase filter 230. For example, in one series of computer simulations, nine lenses were used as phase filters 230 beginning with the first filter being a plus eight diopter lens and progressing in eight diopter increments so that the ninth filter lens was 72 diopters. In another, preferred embodiment of the invention, spatial light modulators of the type made available by Boulder Nonlinear Systems, Inc. can be used as phase filter 230. At present, these modulators are available in arrays of 128×128 or 256×256 pixels and may introduce variable phase change on a pixel-by-pixel basis. In a specific embodiment, the modulator can introduce phase change fixed to $+\pi$ or 0 (a binary phase filter). In alternative embodiments the amount of phase change can be arbitrary, although this may result in some loss of speed. In particular, in a specific embodiment the phase filters can introduce random phase changes in pixel blocks (instead of pixel-by-pixel modifications), which embodiment can reduce the complexity of the device at the expense of some convergence-speed loss.

Element 240 represents the image plane of the apparatus of the present invention. The image focused on image plane 240 can be captured by any suitable calibrated recording medium, such as photographic film or a charged couple device (CCD) array. The image recorded at the image plane 240 is measured in terms of the intensity of the light falling on the image plane 240. It will be appreciated that the amplitudes of the sampled image are proportional to the square roots of the measured intensities.

The series of different images captured at the image plane 240 using the phase filters 230, shall for purposes of this discussion be termed "phasorgrams." Phasorgrams are synthetic intensity images of the complex wave form in the image plane induced by applying shifting of phase filter 230 to the BFP 220 wave function. The complex wave function at the image plane 240 usually does not resemble the actual object 200 either in amplitude or phase distribution. Essentially, phasorgrams are intensity pictures resulting from experiments carried out at the BFP 220 by the different phase filters 230. The intensity data representing the phasorgrams and the knowledge of the filter(s) 230 which created them provide the data required by the new algorithm shown as FIG. 3 to solve for the phase distribution of the object 200.

As shown in FIG. 2, the BFP 220 and the image plane 240 are coupled to a processor 250. This direct coupling represents the embodiment where the intensities of the BFP image and the images at the IP 240 are captured using an electronic device, such as the previously described CCD array. If photographic film is used to capture the images, the coupling of the film to the processor 250 can be achieved through a calibrated optical scanning process (not shown). The software for executing the algorithm of FIG. 3 and the distribution of the known phase shifts of the phase filters 230 are preloaded into the processor 250. As will be more fully described below, in one embodiment of the present invention, intensity data are only measured at the image plane 240 and not at the BFP 220. In this embodiment, there would be no need for a connection between the BFP 220 and the processor 250. Naturally, it will be appreciated that in the case of using a phase filter of the type available from Boulder Nonlinear Systems, Inc., the processor may be used to select the phase angle introduced by the filter for a particular measurement.

Figure 3:
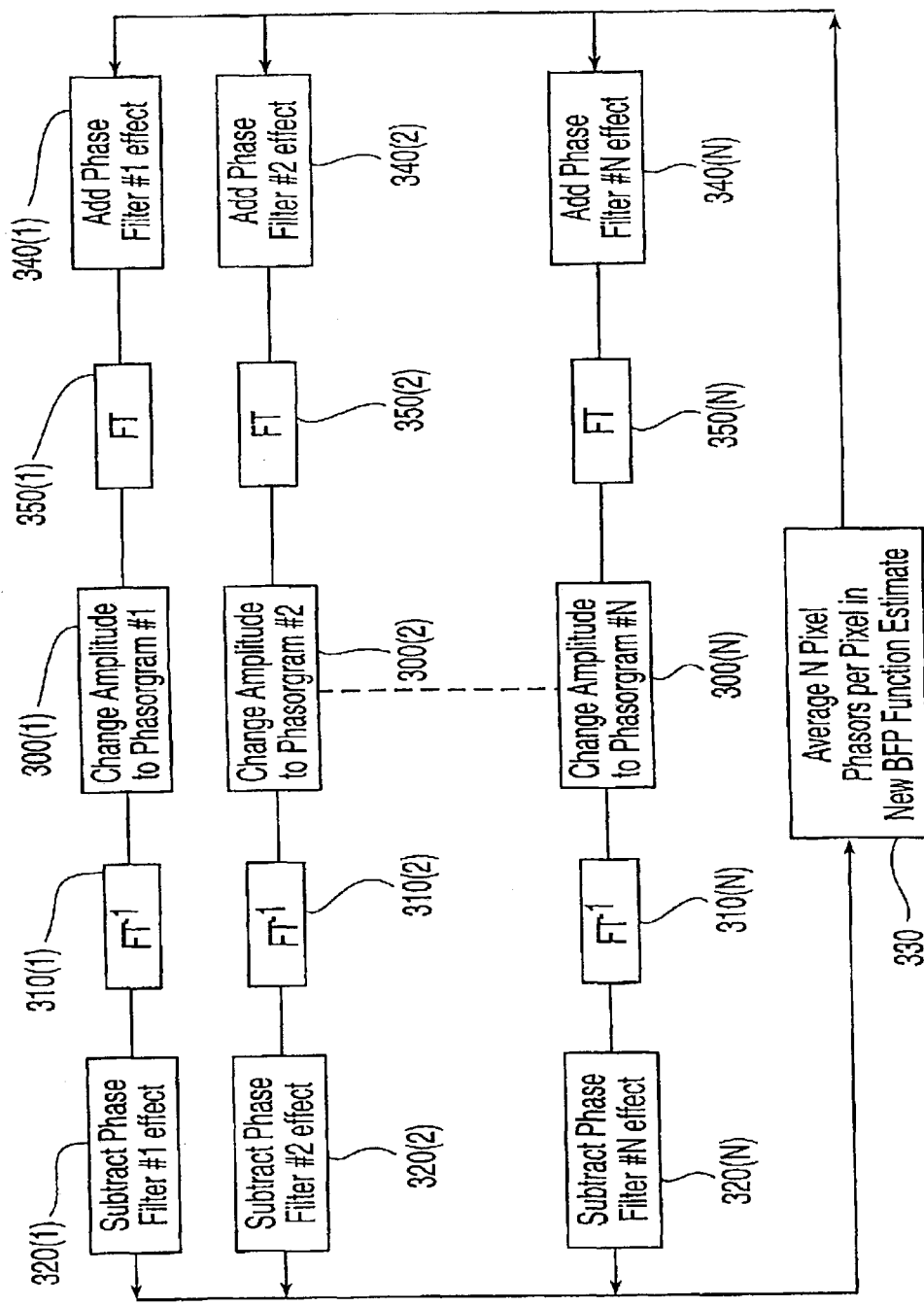
FIG. 3 illustrates in a block diagram form one preferred embodiment of the method of the present invention.
Figure 4C:
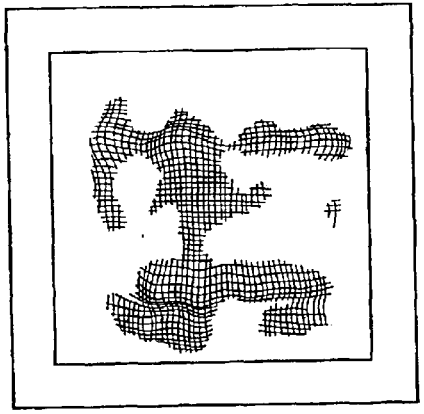
FIGS. 4A–4F show six perspective gray scale image intensity representations obtained using the apparatus of FIG. 2 with a transparent object (a pure phase object)
Figure 4F:
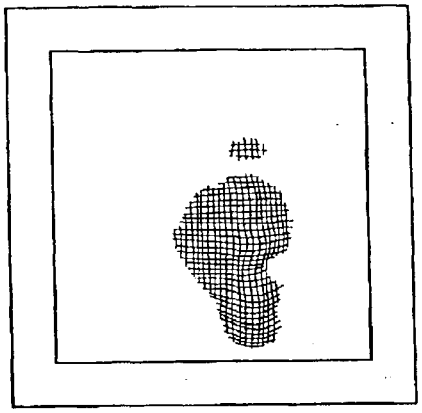
Figure 4B:
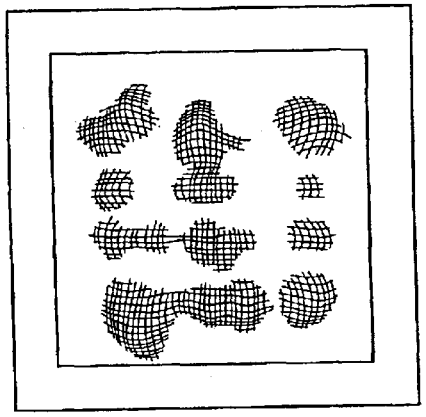
Figure 4E:
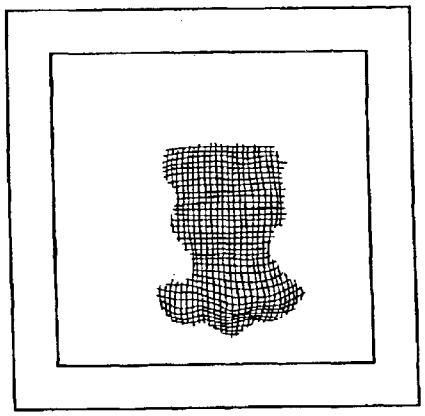
Figure 4A:
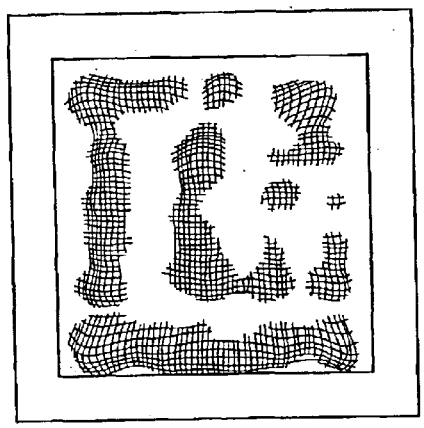
Figure 4D:
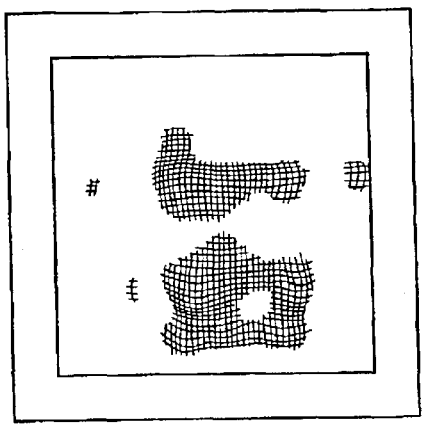

FIG. 3 depicts one embodiment of the process of the present invention for recovering the phase information related to object 200. As previously described, the apparatus of FIG. 2 is used to obtain intensity measurements for N different images, phasorgrams, of object 200 obtained using the phase filter(s) 230. In accordance with the preferred embodiment, the measured intensities for the N different phasorgrams are stored in a memory of the processor 250 along with the phase shifts introduced by the phase filter(s) 230.

In accordance with a preferred embodiment, step 300 is the starting point for the initial iteration of the process of the present invention. For the initial iteration, the amplitudes measured at the image plane 240 (amplitude is the square root of the measured intensity) are used. It is usually assumed for convenience that the phase for each pixel is zero. In other words, the complex wave function in the image plane 240 is assumed to be purely real. If better information exists, then the initial phase distribution estimate should be in accord with it. In the initial iteration no correction is made to the amplitudes of the N phasorgrams.

In step 310(i) inverse Fast Fourier Transform is applied to each of the N phasorgrams. This can be achieved using the Fast Fourier Transform Algorithm of Cooley and Tukey which is well known to those engaged in the art of Image Processing. See Cooley, J. & Tukey, J. Mathematics of Computation, 19, 297 (1965). It will be appreciated that inverse transforming the individual phasograms can be performed either in parallel (where speed is of the essence) or sequentially. Thus, index (i) in step 310 in FIG. 3 should be interpreted to cover both embodiments. Accordingly, with reference to FIG. 2, depending on the type of processor 250 used, the inverse Fourier transform can be computed either sequentially for each of the N phasorgrams (i=1, . . . , N) or can be performed in parallel.

In step 320, the known phase shift for each pixel, which is contributed by its corresponding phase filter 230 (FIG. 2), is subtracted from the resulting complex wave function. As in the case of the inverse Fourier transform computation, this operation for each complex wave function (i=1, . . . , N) can be done either sequentially or in parallel. The result of the subtraction step 320 is an estimate of the complex wave at the conjugate BFP 220. (Please refer to FIG. 2 for clarity). In the following processing step these N estimates are saved in a computer memory. In accordance with the embodiment illustrated in FIG. 3, no actual data which could have been measured at the BFP 220 (FIG. 2) is used.

In a preferred embodiment, the N complex wave estimates in the BFP 220 are then summed and the sum is divided by N in step 330 to obtain a single averaged estimate of the BFP complex wave function. Using this estimate, the known phase shift for each pixel contributed by its corresponding filter is then added back to yield N different wave forms of equal amplitude distribution but with different phase distributions (step 340). Alternatively, if intensity data have been measured at the BFP 220, the measured amplitude data are used to correct the amplitude of the averaged estimated complex wave function at step 330 as well.

After the known phase shift for each pixel contributed by its corresponding filter has been added to yield N different wave forms in step 340, the N wave forms are each Fast Fourier Transformed (step 350) to yield N new estimates of the complex wave in the conjugate image plane 240. Each of these estimates are then corrected to have the corresponding amplitude distribution as its measured phasorgram (step 300). The phase distribution at this point is not modified.

Once the estimated image plane wave forms have been corrected with respect to the actually measured phasorgram amplitude distributions, the process steps 300–350 are repeated until the amount of correction necessary in step 300 is reduced below some threshold. In most cases that occurs when the Fractional Error, that is the SSE over all N images divided by the amplitudes squared over all N images (the total energy), is less than 0.0001. It will be appreciated that in different applications different Fractional Error thresholds can be used.

The procedure described with respect to FIG. 3 is guaranteed to reduce or at worst maintain the Sum of the Squared Error (SSE) defined by the difference in the estimated amplitude for each pixel and its measured value in the phasorgram, for all the pixels in all N phasorgrams. In contrast to the methods of the prior art, by using the method of the present invention it is possible for the "partial" SSE taken over any but not all the N phasorgrams to actually increase from one iteration to the next. However, the total SSE (summed over all phasorgrams) can not increase from one iteration to the next.

FIGS. 4A–4F depict perspective gray-scale representations of 6 images (phasorgrams) obtained by using the apparatus of FIG. 2. These computed images simulate photographing a transparent phase object 200 (FIG. 2) through a series of 6 different dioptric lenses 230 (FIG. 2) placed successively in the BFP 220. The differences in the images 4A–4F are due solely to the different lenses 230 used. But for the insertion of lenses 230, all of the images would have been white, as the object 200 was transparent. The image plane 240 used in the first experimental set up was sampled on a 16×16 square grid. Satisfying the requirements of the fast Fourier Transform algorithm of Cooley and Tukey there were then 256 pixels in a 16×16 grid in the BFP 220 also.

The first experiment was performed using an object 200 which was transparent but had a graphically recognizable phase function. Again, phase is not detectable with intensity recording media nor with a human eye. Thus, the object and its graphically recognizable phase distribution were invisible. The phase distribution was in the form of a block letter "G" at a constant phase value of 3.0 radians set in a field whose phase in radians is given by:

$$\text{theta}(r,c)=(r^3+0.5\ c^3)/810-3.14159$$

where r=the row number of the 16 by 16 picture matrix (0 to 15)

c=the column number of the 16 by 16 picture matrix (0 to 15)

A second experiment was conducted using a second object 200, which was again transparent but with the phase for each object pixel this time chosen from a uniform random distribution spanning the range between $-\pi$ and $+\pi$. That is, each pixel was totally independent in phase from any of the other pixels.

In each of these two experiments, a series of 6 convergent dioptric lenses was used as phase filters 230 (FIG. 2) and intensity measurements were taken at the image plane 240. These lenses 230 added to the phase of the wave function in the BFP according to:

$$NR^2/10$$

where n is integer from 1 to N for each different lens filter; and

R is the radius of the pixel in the back focal plane.

Yet another, a third experiment, using the same random phase object 200 of the second experiment was conducted. For the third experiment, a series of random phase filters 230 replaced the dioptric filters of the first two experiments. The random phase filters 230 shifted the phase of each pixel in the back focal plane according to a uniform distribution between $+\pi$ and $-\pi$. Each random phase filter used in this series had a cross correlation figure between +0.1 and −0.1 with respect to any of the other filters in the series.

Figure 5A:
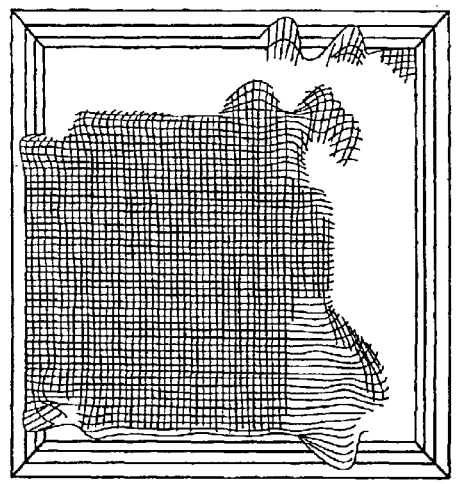
FIGS. 5A–5D are perspective gray scale representations of the phase of a particular transparent object as it develops during the course of iterations in one embodiment of the method of this invention.
Figure 5B:
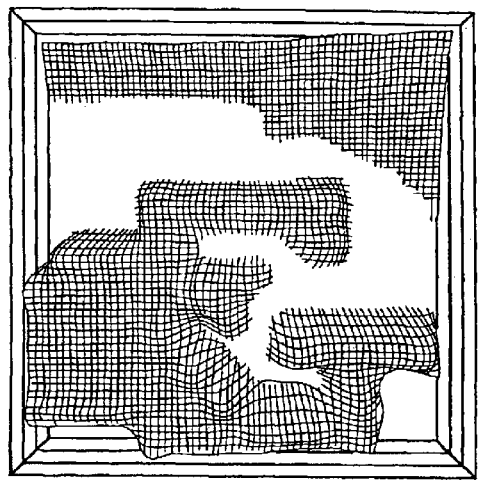
Figure 5C:
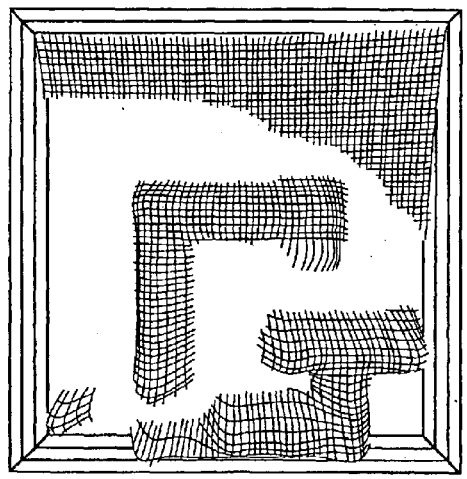
Figure 5D:
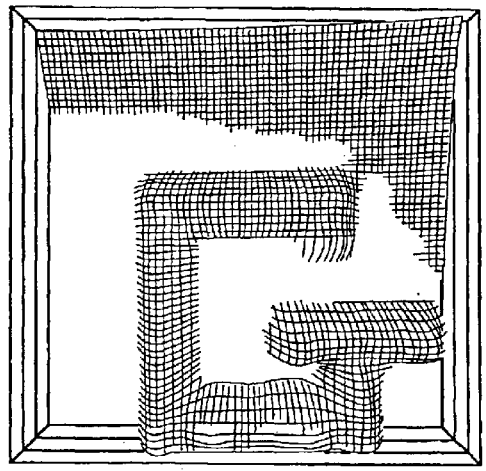

FIGS. 5A–5D illustrate the progress of the algorithm (FIG. 3) as it recovers the phase distribution of the object 200. Shown are the phase estimates, as the number of cycles of the algorithm increase, in the first experiment. FIG. 5A illustrates the phase estimate after 10 iterations of the process steps 300–350. FIG. 5B illustrates the same after 90 iterations while FIGS. 5C and 5D illustrate the phase estimate after the 114th and the 126th iterations respectively.

As clearly illustrated in FIG. 5D, the method of the present invention was able to recover the phase information for the wave front emanating from the transparent object 200.

The initial phase estimate, which is not illustrated in FIG. 5, would be uniformly white since the function is initially assumed real. After the 10th estimate illustrated in FIG. 5A, the fractional error between the estimated function and the measured function was 5%. After the 90th estimate illustrated in FIG. 5B the fractional error was 0.8%. After the 114th iteration, the fractional error was reduced to 0.09% and in the final estimate illustrated in FIG. 5D, the fractional error was a mere 0.01%. These fractional errors are measured in the specific embodiment as the total error energy (the sum of the SSE over all six phasorgrams) divided by the total phasorgram energy (over all six phasorgrams).

Figure 6:
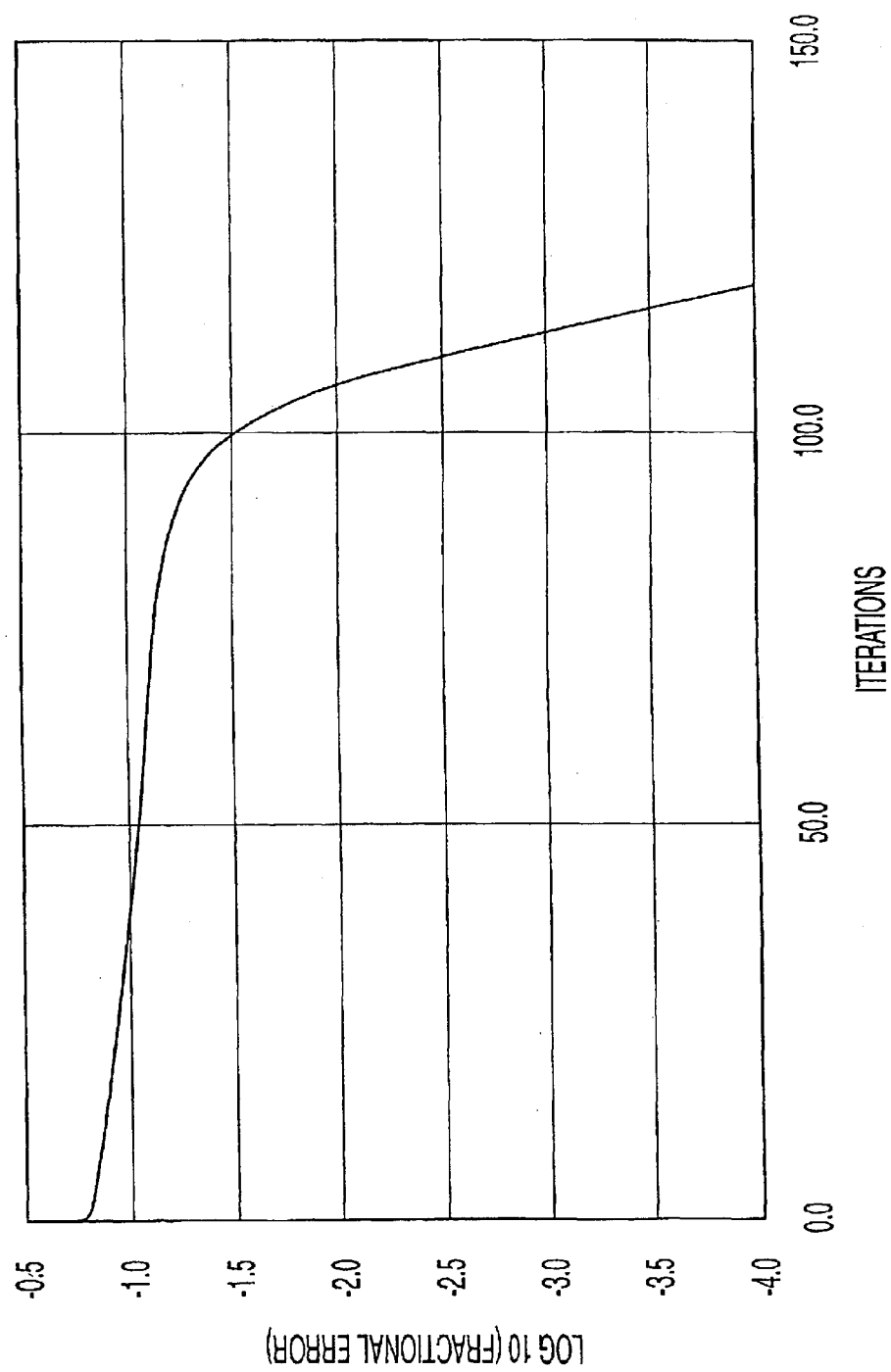
FIG. 6 is a typical graph illustrating the calculated Sum of the Squared Error (SSE) for all N images divided by their total energy (i.e., SSE/Total Energy) as a function of the number of iterations in accordance with one embodiment of the method of the present invention.

FIG. 6 illustrates a graph of the results of the second experiment using a transparent random phase object 200 and 6 different dioptric lenses 230. This graph has been made in terms of the log base 10 of the fractional error of the phasorgram as a function of the number of iterations of the method. Again, this experiment used 6 different convergent lenses 230 in the BFP 220 and used a transparent random phase object 200. As seen in the graph, the early iterations show a slow decrease in the error energy which is deemed a "search phase." During this "search phase" the fractional error decreases very slowly, of the order of less than one in one thousand per iteration. Although the error is slowly decreasing, the phase of the pixels is actually changing at a good rate. The fractional error appears to indicate the algorithm is failing, while in reality, the algorithm is moving at a good pace towards a solution. At approximately 100 iterations, there is a quite rapid closure to the final solution.

Figure 7:
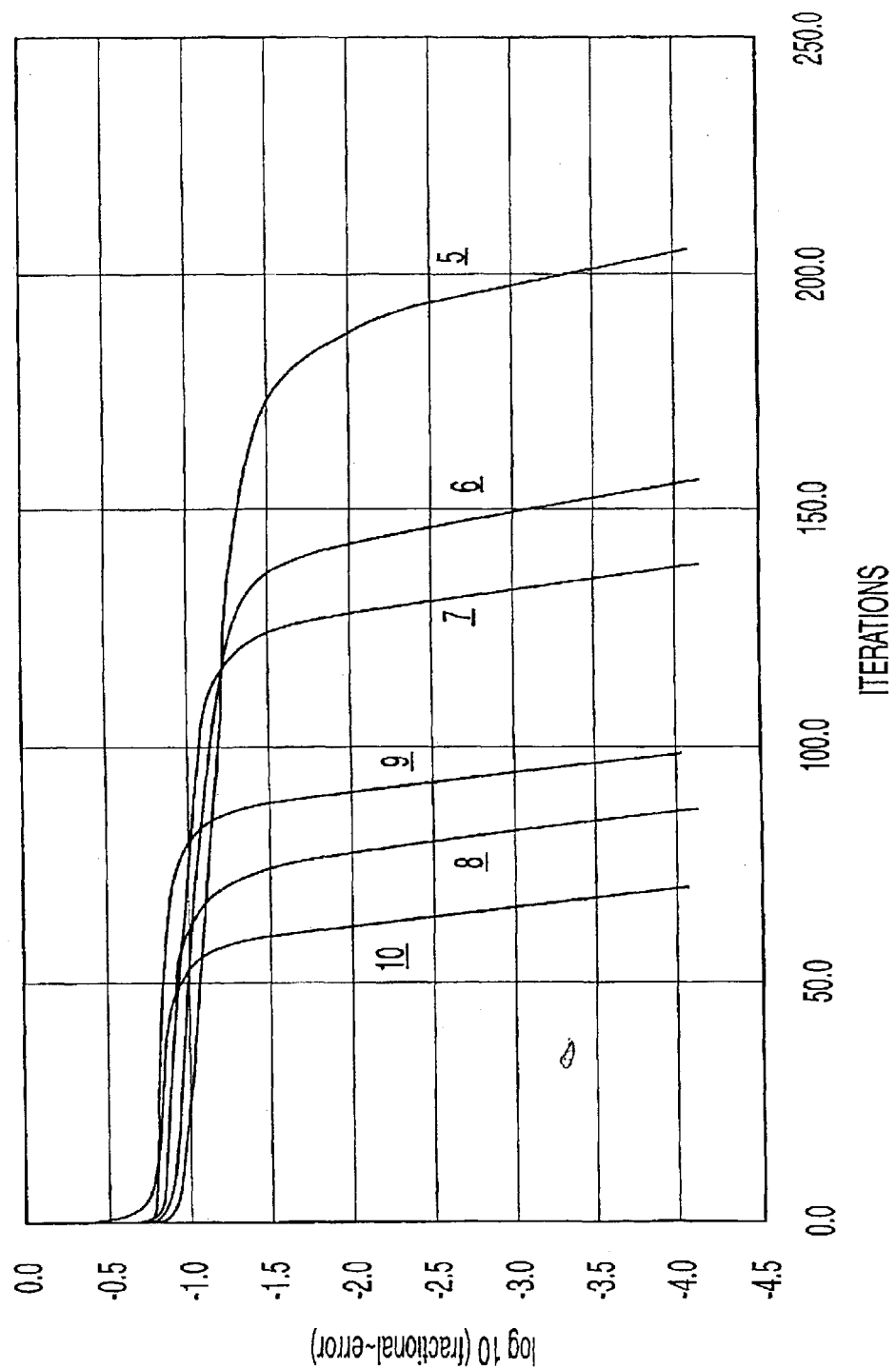
FIG. 7 is a graph illustrating the calculated Fractional Error versus the number of iterations in one embodiment of the method of the present invention for different numbers of sets of data.

FIG. 7 illustrates the results of the third experiment using 6 random phase filters 230 and the same random phase transparent object 200. Once again, this Figure illustrates a graph of the fractional error as a function of the number of iterations of the method of the present invention. Each of the curves illustrates the progress of the method with different runs using diverse numbers of phasorgrams to reconstruct the object phase. The processing which experienced the longest time used 5 phasorgrams, while the quickest one processed 10 phasorgrams. As illustrated in this Figure, each of the processes experienced the initial slow decrease with iteration number and a subsequent rapid decent of the error as the method homed in on the correct solution. Except for a minor reversal in the runs using 8 and 9 phasorgrams, it generally appeared that the more phasorgrams used, the fewer the iterations required to recover the phase distribution.

It may be noted that in the context of the above experiments attempts to recover the phase distribution with less than about 5 phasorgrams were generally unsuccessful, with the algorithm failing to reduce the fractional error beyond a practical point. It appears that the algorithm had "locked." It is unclear whether the minimum number of phasograms reaching a satisfactory solution represents a more fundamental constraint on the method. It may be of further interest to note that the original Gerchberg-Saxton algorithm could only use data from two intensity images to try and recover phase distributions, while the method of the present invention places no limit on the number of intensity images (phasorgrams) that can be used.

Figure 8:
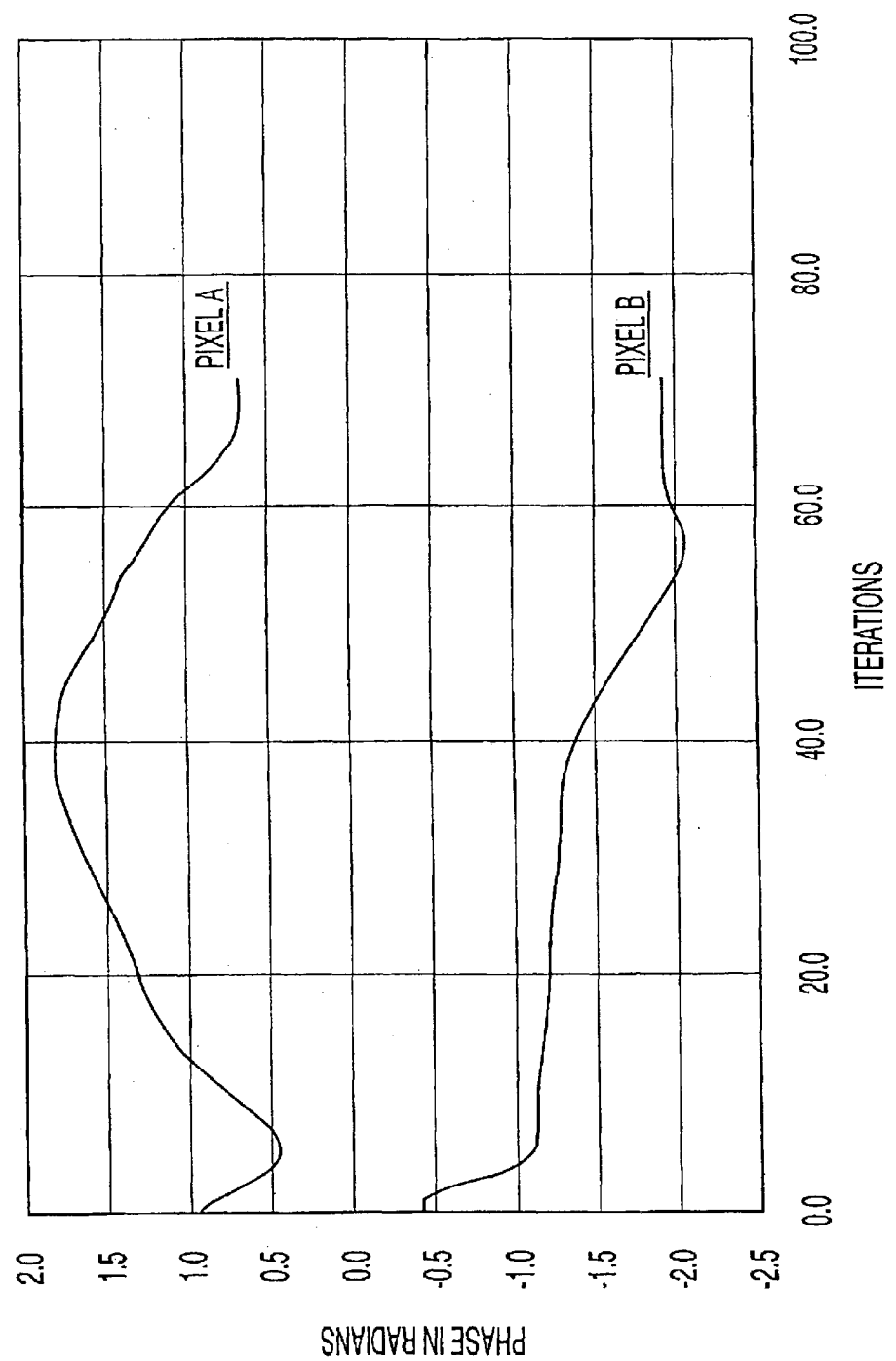
FIG. 8 shows the progression of the phase estimates of two typical pixel phasors as the computational algorithm illustrated in FIG. 3 iterates.

FIG. 8 depicts the phase of two different pixels as a function of the number of iterations. The processing of these pixels corresponds to the curve of the processing of 10 phasorgrams depicted in FIG. 7. In comparing the graphs of FIGS. 8 and 7, it is noted that during the "search phase" (approximately between the 1st and 50th iteration) even though the error is decreasing slowly (FIG. 7) the estimated phase of each of the pixels is changing quite rapidly. This rapid change in the pixel phase flattens out as the solution to the function is approached (approximately above the 60th iteration).

In a second embodiment of the present invention, data measured at the BFP 220 are used in the method of the present invention. Briefly, intensity measurements in the BFP 220 are made. This in itself is not a novel technique and does not present any conceptual difficulties. For example, it presents no problem to collect intensity values in both the BFP and IP planes in a transmission electron microscope. In certain contexts the physical realizability of achieving these data maybe more or less difficult.

In accordance with a specific embodiment of the method of the present invention, these data can be used to correct the amplitudes of the BFP estimate in step 330 of the algorithm depicted in FIG. 3. That is, once the averaged estimate for the wave in the BFP 220 is achieved, the amplitude distribution of the estimate is replaced by the measured amplitude distribution, while retaining the estimated phase distribution. Then the algorithm proceeds as before. This additional step in the algorithm appears to be quite effective in speeding up the process of finding the phase distribution of the object, as can be seen in FIG. 9.

Figure 9:
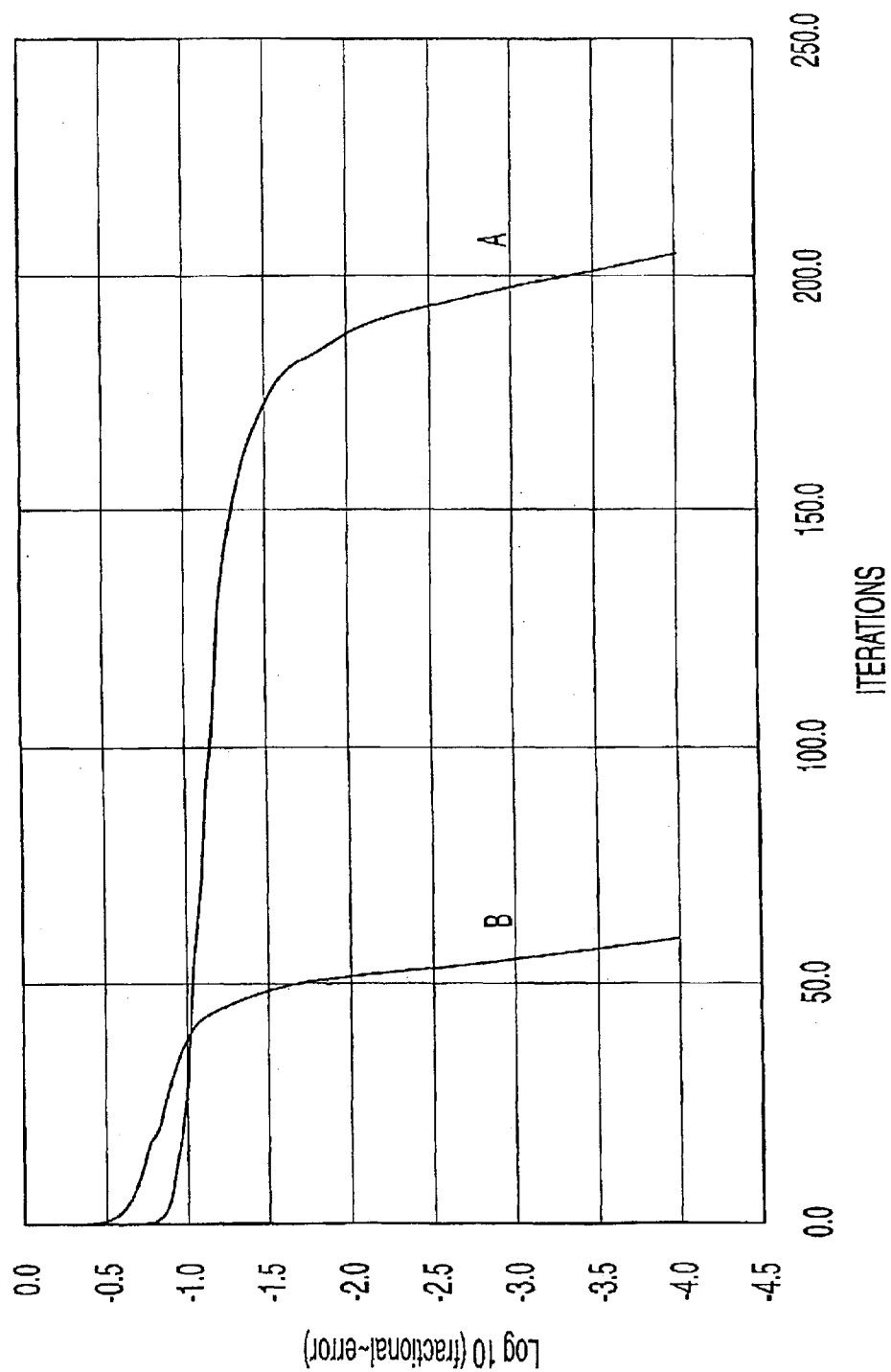
FIG. 9 is a graph of Fractional Error for an experiment run using only data from the image plane (graph A) in comparison to the same experiment using data from both the back focal plane and the image plane (graph B)

FIG. 9 illustrates a comparison between the fractional error measured using the first embodiment of the invention (with no BFP measurements) and that experienced using the second embodiment, in which measured data from the back focal plane are employed. Each of these graphs was obtained using 5 initial phasorgrams. Graph A illustrates the progress of the process using only the data measured at the image plane, while graph B indicates the progress of the method using data from both the back focal plane and image plane. As seen in FIG. 9, when the data from the back plane is used, a drastic decrease in the number of iterations required to solve the problem is experienced. As seen in FIG. 9, adding data from the BFP increases the efficacy of achieving a solution as opposed to only using the data from the image plane.

Note that in the iterative process of this invention, wherever correction involves retaining the phase estimate and correcting the pixel amplitude, another correction is also possible which may be more or less efficacious. Thus, if the $(j-1)^{th}$ phase estimate, $y_{j-1}$ of the pixel is available and the $j^{th}$ phase estimate is generated $y_j$ then the new phase $y_{j\ new}$ may be anywhere in the range $y_{j-1} < y_{j\ new} < 2y_j - y_{j-1}$. The range obviously includes $y_j$ which is the value used for $y_{j\ new}$ in the illustrations of this disclosure.

Phase Recovery Using Stops, Variable Drift Space, Lossy Filters, and Other Approaches In another important aspect of the invention, it was discovered that absolute stops placed in the illuminating conjugate plane can also be used with only a slight modification of the processing algorithm to unambiguously recover the phase function of a wave front. The same results can also be accomplished by varying the drift space between the two conjugate planes (one containing the intensity/amplitude of the wave front and the other containing the intensity/amplitude of the Fourier Transform of the wave front). Moreover, lossy phase filters and lossy stops have been found to be valuable in certain practical applications. Thus, in accordance with this aspect of the invention, several different types of physical elements or processing mechanisms can be used to generate synthetic images (phasorgrams) in a diffractive imaging device. In particular, it is shown possible to use the invention to build X-ray microscopes, as well as other lens-free and lensed imaging devices.

The case for the use of stops in the process of recovering phase information can be appreciated better when it is realized that the conjugate Fourier or Fresnel transform planes may both be available for experimentation even without the use of a focusing device. Thus, in the case of microscopy for example, both the specimen plane and its diffraction or Fresnel transform plane are available for phase filtering or stopping and diffraction pattern recording and measuring, respectively. Also, the length of the drift space between the specimen plane and the diffraction plane (the two conjugate planes in this example) is easily varied, which is an important practical consideration.

One major problem of X-ray microscopy is the fact that there is no effective lens that can be used to refract X-rays. In one aspect of the invention, this problem can be overcome using sheets of material absorbing the radiation with holes distributed according to different but known patterns and laid each in its turn on a flat specimen slide. In a preferred embodiment, the sheet can be made of lead. In accordance with this embodiment, radiation passing through these stops creates different images (phasorgrams) in the diffraction plane. In accordance with the invention, these images provide the necessary data to reconstruct the complete wave function.

In another embodiment, an X-ray microscope can be designed so that changes in the drift space between the specimen plane and the measuring plane are used to generate diverse diffraction patterns (phasorgrams) as input to the processing algorithm that recovers the wave front in its entirety (both amplitude and phase).

Figure 10:
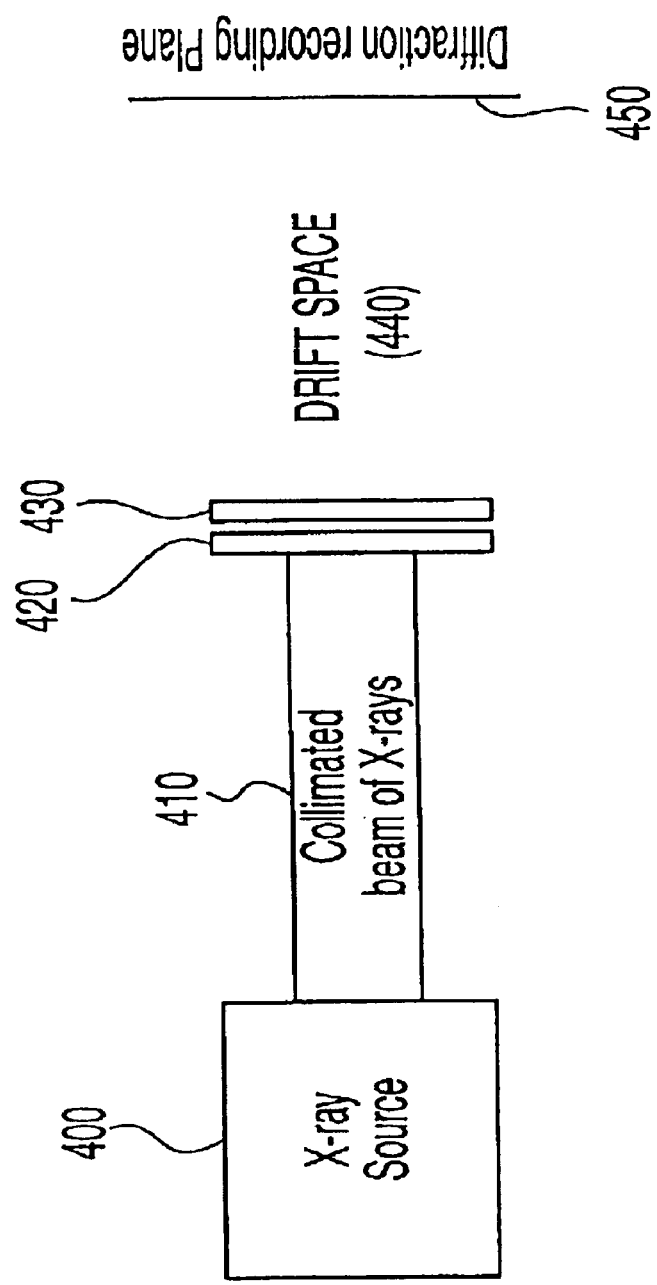
FIG. 10 illustrates in a block diagram form a device that can be used in one preferred embodiment to recover phase information using a series of amplitude stops.

FIG. 10 shows in a block diagram form a device that can be used in a first preferred embodiment to recover phase information using a series of stops. An important practical application of such as device is in the design of an X-ray microscope. As shown, the device comprises a source of radiation 400, which in the specific embodiment illustrated in the figure is X-ray radiation. The radiation source 400 in a preferred embodiment generates a collimated beam of radiation 410, which could be X-rays, the beam providing a planar uniform unmodulated wave front that illuminates the specimen 420 and is modulated by it. In a preferred embodiment, a thin sheet stop 430 with holes is placed on the specimen downstream from the radiation source. The modulated beam drifts across a pre-determined drift space 440 to register its intensity distribution in the conjugate diffraction plane 450 to the to the specimen plane. A detection device (not shown) is used to measure the intensity of the wave front at the plane 450. This device could be of any type known in the art to be suitable for the specific application and radiation type. Generally, the device further comprises memory (not shown) for storing the intensity distributions captured by the detection device and a processor, as known in the art, for processing the stored distributions pursuant to the algorithm set forth below.

In operation, the process of passing radiation beam through the specimen and modulating the output using different stops 430 is repeated with several different stops to yield a set of diverse images. These images are used as input to the processing algorithm, which for a specific embodiment is illustrated in a block diagram form in FIG. 11. It will be appreciated that the design illustrated in FIG. 10 could be used as a lens-free light microscope as well, for different practical applications, but it has special relevance in the case of X-rays where a lens capable of focusing X-rays does not currently exist. It will further be appreciated that the selection of the drift space in accordance with this invention will depend upon the resolution desired in the final image of the specimen, and the wavelength of the radiation source 400. With these two parameters set, the drift space between the two planes can be calculated using several known in the prior art approximations to the diffraction equations. See, for example, chapter 4, "Fresnel and Fraunhofer Diffraction," in Goodman, J. P., "Introduction to Fourier Optics," McGraw Hill, New York, pp. 57–74 (1968), which is incorporated herein by reference for background.

Figure 11:
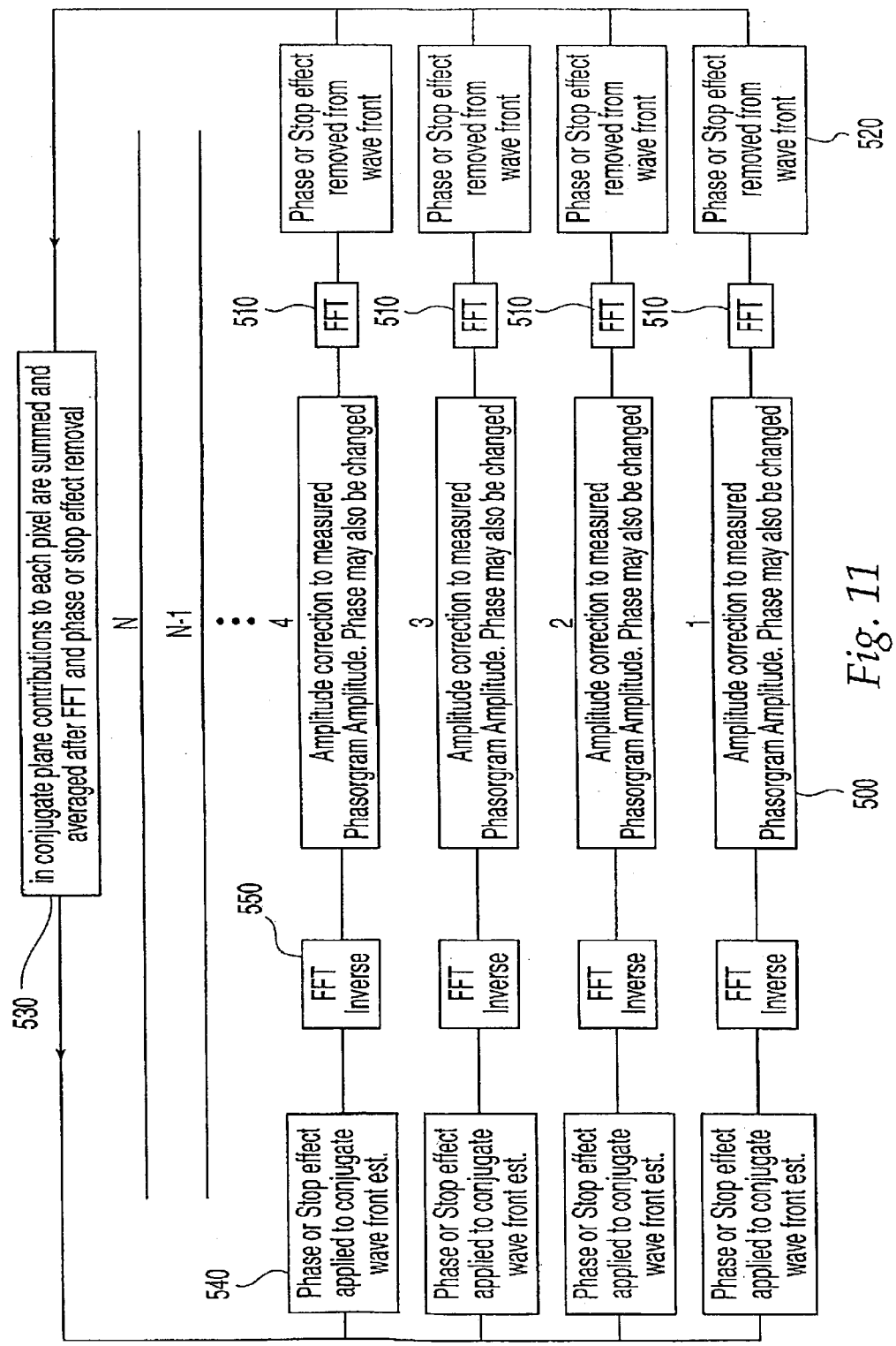
FIG. 11 shows a flow chart of another preferred embodiment of the method of the invention modified for use with stops.
Figure 12:
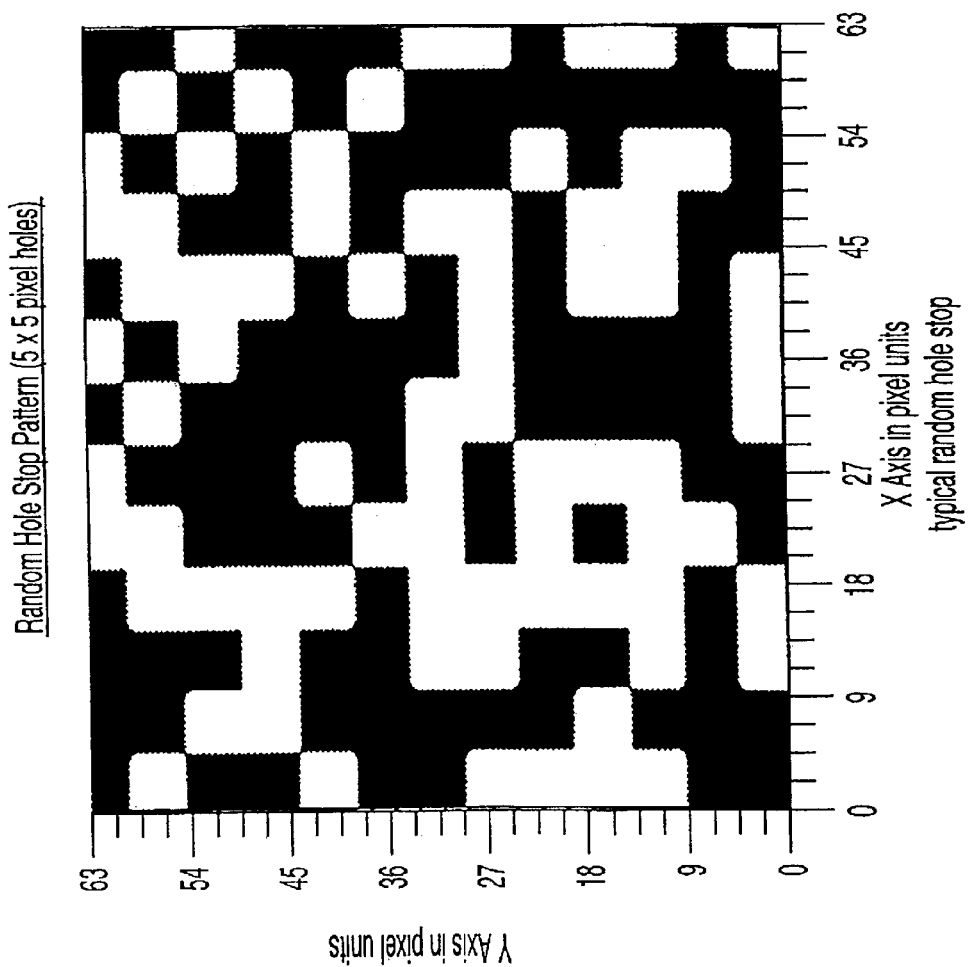
FIGS. 12 and 13 show two different stops that can be used in accordance with the present invention, where the illustrated stops have been used in computer simulations of a working X-ray microscope.
Figure 13:
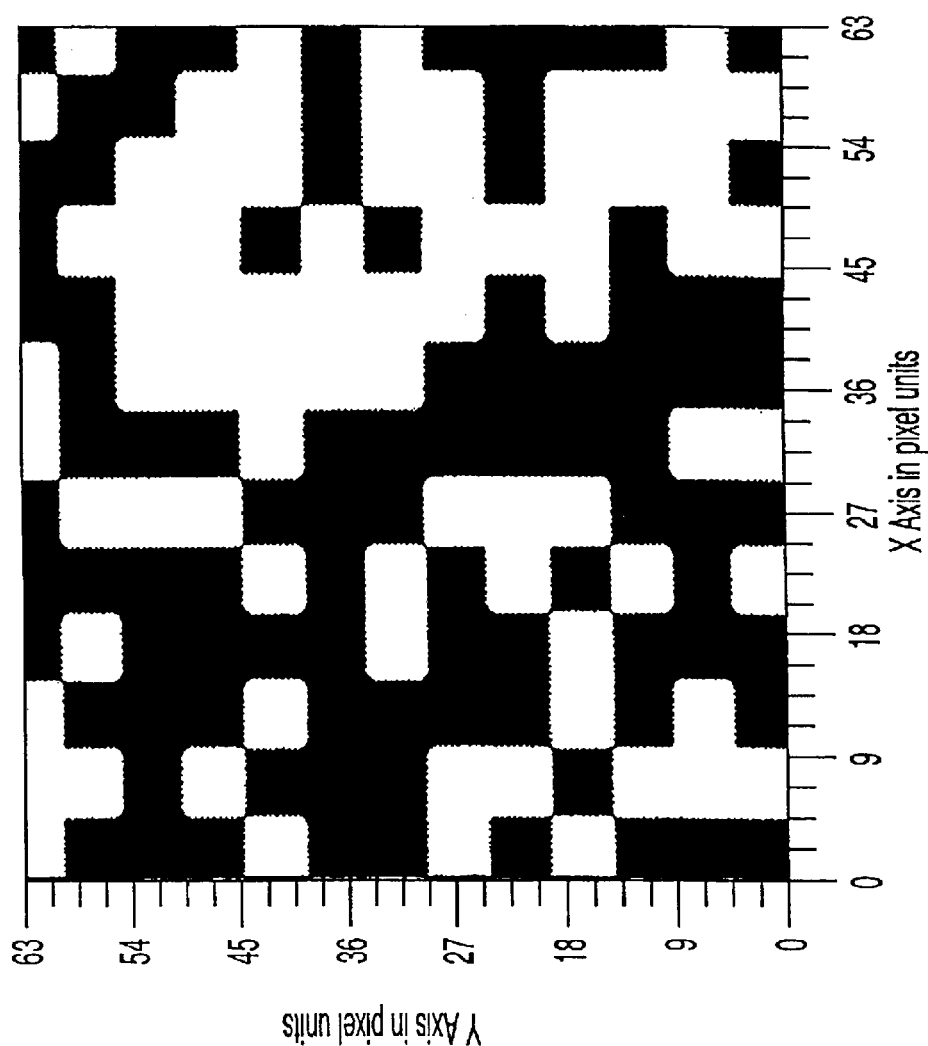

FIG. 11 shows a flow chart of the algorithm, which uses the data provided as the intensity/amplitude of the wave front in the diffraction plane for each different stop employed in the conjugate plane and the specifications of that stop. It will be appreciated that in the case of an X-ray microscope, the conjugate or illuminating plane is at the specimen. FIGS. 12 and 13 show two of the different stops, which have been used in computer simulations of a working X-ray microscope in accordance with the present invention. In these two simulations, the holes in the stop, which is made of lead in a specific embodiment, are represented as white and the lead or area which completely blocks the wave is shown in black. In the specific embodiment used for the simulation the holes are five pixels by five pixels square, although it will be appreciated that other sizes can be used in different embodiments.

In a specific embodiment, the decision as to whether an area is blocked or not is done on a random basis by choosing from a uniform probability distribution. Thus, such decision can be made essentially on a "head or tails" basis. It will be appreciated, however, that the algorithm requires knowledge of which pixels on the specimen are blocked in each stop. In alternative embodiments of the invention the design and placement of the holes may be optimized in a programmed way for different practical applications. Thus, dependent on the application, it may be desirable to reduce the number of filters N and thus the radiation exposure time. Alternatively, it may be desired to focus on optimizing the convergence speed of the algorithm. Different optimization criteria may be used in different practical applications, and will become apparent as more empirical data regarding the applications of the algorithm becomes available.

For example, in contrast to the essentially random distribution used in the above-described embodiment and illustrated in FIGS. 12 and 13, a set of mathematically independent two-dimensional filter masks can be used in another embodiment of the invention. Thus, a Hadamard function can be used to generate an appropriate set of blocking patterns for the filters used in this embodiment. It will be appreciated that the use of orthogonal (or orthonormal) filters may speed up the convergence of the algorithm. In terms of selecting the optimum number of filters N, it is expected that although in practical simulations five or six filters have been shown sufficient in most cases, the actual number may depend on the underlying level of detail and the desired resolution. To take this information into account, in one embodiment of the invention it is proposed to take the singular value decomposition of a matrix containing the wave function of a known representative sample of a typical material under investigation, and select the number of filters N to correspond to the number of singular values that exceed a predetermined magnitude threshold. Various modifications to the above mentioned approaches can be used in alternative embodiments, as will be apparent to those of skill in the art. Such approaches thus clearly fall within the scope of the invention, as defined in the claims.

Turning back to FIG. 11, it shows a flow chart of the iterative algorithm that discovers the phase of the wave front in the diffraction plane for each of the phasorgrams measured there and therefore the phase and amplitude of the modulated wave leaving the specimen. Briefly, processing begins with the phasorgram intensity/amplitude data from the diffraction plane. The first phasorgram amplitude data, coupled with an estimate as to the correct phase distribution (for example, assuming the numbers to be pure real has proven quite satisfactory as a starting point) are Fast Fourier Transformed at 510. It will be appreciated that as in the case illustrated in FIG. 3, if a priory information is available, it may be used instead. Then, those pixels which are not blocked by the corresponding stop at the specimen are credited with the complex amplitude which the Fourier Transform provides for them. Each of the phasorgrams in turn is similarly Fast Fourier transformed and each pixel at the specimen or conjugate plane is credited with the complex number that the Fast Fourier Transform has provided it, if that pixel is not blocked. The sum of the complex numbers received by each pixel from the transformation of all the phasorgrams from the diffraction plane is averaged 530 in a preferred embodiment to form a new estimate of the complex wave front leaving the specimen. It should be noted that in embodiments of the invention using amplitude stops the averaging is different for each of the pixels in the specimen plane, since the number of complex number contributions varies depending on how many of the stops blocked that particular pixel. In accordance with the preferred embodiment, there will always be at least one contribution to each of the pixels at the specimen because the first stop employed is no stop at all, making the first phasorgram the ordinary diffraction pattern from the specimen modulation only. This presents a modification compared with the processing algorithm using only phase filters. It will be appreciated that for partial or lossy stops and for lossy phase filters, the contribution to each pixel will be equal to the number of lossy filters or lossy stops used, since they will not completely block the contribution to any pixel. In these cases, each of the contributions will have to be corrected to remove the effect of the respective filter or partial block before the contribution is averaged to form the new wave estimate at the specimen.

Turning back to FIG. 11, the new wave estimate is now modified (540) in turn by each of the filters or stops providing N new wave fronts for which subsequent inverse Fourier Transformation 550 will provide the diffracted wave at the diffraction plane. At the diffraction plane, each of the N diffracted wave fronts is corrected to match the measured intensity/amplitude of the corresponding phasorgram. The phase of the complex number is typically retained, although in different embodiments of the algorithm, it too may be corrected as shown in FIG. 3. The new phasorgram estimates are corrected to match the intensity/amplitude of the measured phasorgram and the algorithm begins the next iteration. The algorithm finishes iterating when the correction applied to the phasorgram amplitude estimates in the diffraction plane is deemed sufficiently small. As before, the error measure used in a specific embodiment can be set equal to the Fractional Error discussed above, and the threshold selected to stop the iteration can be selected based upon the practical application. In a specific embodiment, the threshold is selected 0.0001. It will be appreciated the alternative error measures and/or thresholds can be used in different embodiments.

With further reference to FIG. 11, in accordance with a preferred embodiment an X-ray microscope can be built, involving the use of stops and the algorithm illustrated herein. Thus, referring back to FIG. 10, an X-ray beam emerging from the specimen 420 has been modulated in phase and amplitude and the task of the microscope will be to retrieve this modulated wave front. The modulated wave front is described adequately as a complex function in two dimensions, in which each pixel is a complex number expressed as an amplitude and a phase. This can be represented as the complex function $U_1(x,y)$ in a two dimensional coordinate space. In accordance with the invention, the function $U_1(x,y)$ has to be determined. In the embodiment illustrated in FIG. 10, the stops 430 block different parts of the wave front, resulting in different complex wave functions at the diffraction plane (the diverse phasorgrams). It has been shown that the wave at the diffraction plane is related to the unblocked wave at the specimen as follows:

$$U(x_0, y_0) = \frac{e^{jkz}}{j\lambda z} e^{j\frac{k}{2z}(x_0^2+y_0^2)} \int\int_{-\infty}^{\infty} U(x,y) e^{j\frac{k}{2z}(x^2+y^2)} e^{-j\frac{2\pi}{\lambda z}(x_0 x+y_0 y)} dx\, dy \quad (1)$$

At the diffraction the Fourier Transform is of the specimen plane wave multiplied by a quadratic phase factor so that the diffraction wave front is actually related to the unblocked specimen wave front as the Fourier Transform of the specimen wave front multiplied by a quadratic phase factor. The algorithm solves for this function, which then must be corrected to cancel the quadratic phase factor.

An alternate way of building a X-ray microscope in accordance with this invention is to vary the length of the drift space to provide diverse diffraction images. In this embodiment no stops or filters need to be used to modulate the wave at the specimen plane. This can be appreciated with reference to the Eq. (1) above. In particular, changing the length of the drift space in accordance with this embodiment of the invention changes the value of z. Therefore, the quadratic phase factor multiplying the wave front at the specimen is changed for each different length z of the drift space. Mathematically this is equivalent to using different optical lenses at the specimen, which are effective at all frequencies including those of X-rays. Such lenses can be represented as quadratic phase filters according to the formula:

$$e^{-j\frac{k}{2f}(x^2+y^2)}$$

where f is the focal length of the lense, so the equivalent lens at the specimen is just $-1/z$ diopters.

Thus for example, if the drift space is 1 centimeter, the equivalent lens modifying the specimen wave front is $-100$ diopters. At 10 centimeters, the drift space would be equivalent to a $-10$ diopter lens. This makes building a lensless variable-drift space X-ray microscope the same as using lenses as phase filters at the specimen or conjugate plane. This was shown to be effective in the embodiments shown above, and the processing algorithm may be used as illustrated in FIG. 11 and/or FIG. 3 without alteration.

Figure 14:
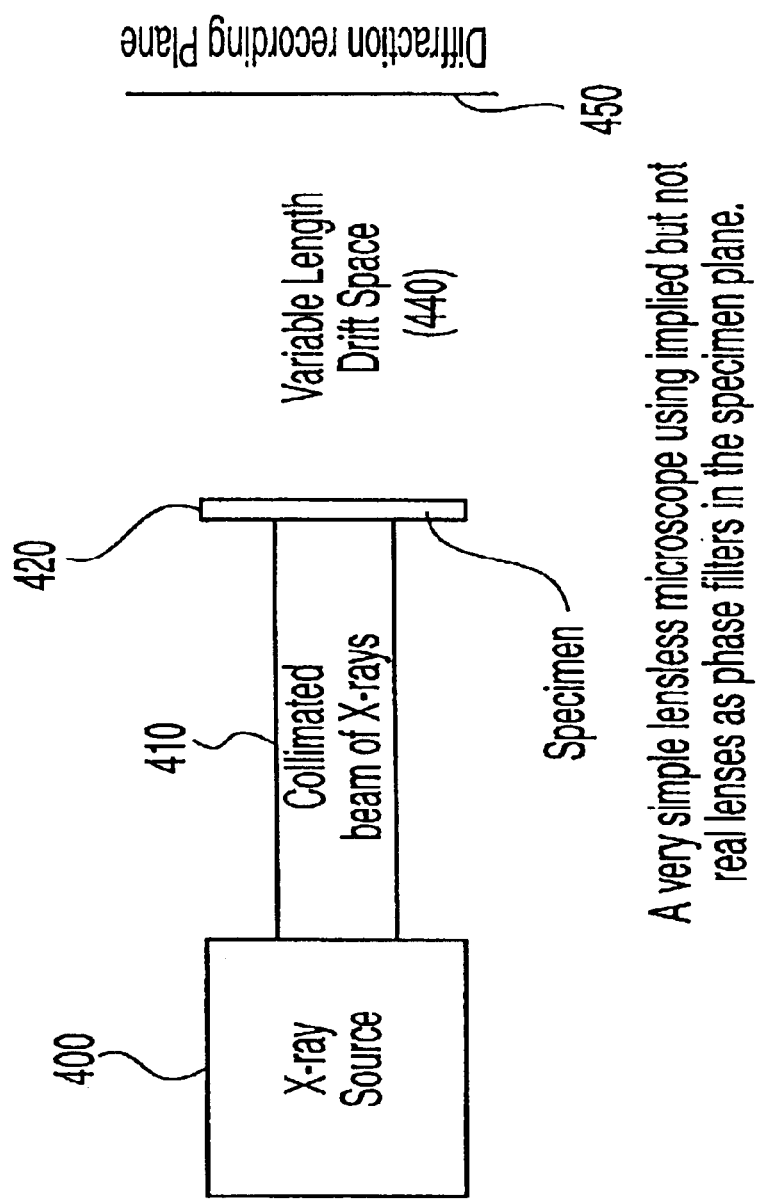
FIG. 14 shows in a block-diagram form a variable-drift microscope device in accordance with another embodiment of the invention.

FIG. 14 shows a simple block-diagram scheme for a variable-drift microscope in accordance with this embodiment. Using the notations in FIG. 10, the implementation includes the same basic components, except that the stops 430 used in the embodiment illustrated in FIG. 10 are replaced with a mechanism capable of providing accurate variable-length drift space (not shown). It will be appreciated that any practical mechanism ensuring the required accuracy can be used.

FIGS. 15(A–H) show simulated results of the operation of an X-ray microscope built in accordance with the present invention using six stops. The field was 64 by 64 pixels with repeat units of the specimen being 8 pixels by 8 pixels. The holes in the stops used ni the illustrated embodiment were 9 pixels by 9 pixels. The result was a perfect reconstruction of the wave front and is typical of all the simulated runs tried thus far.

Figure 15A:
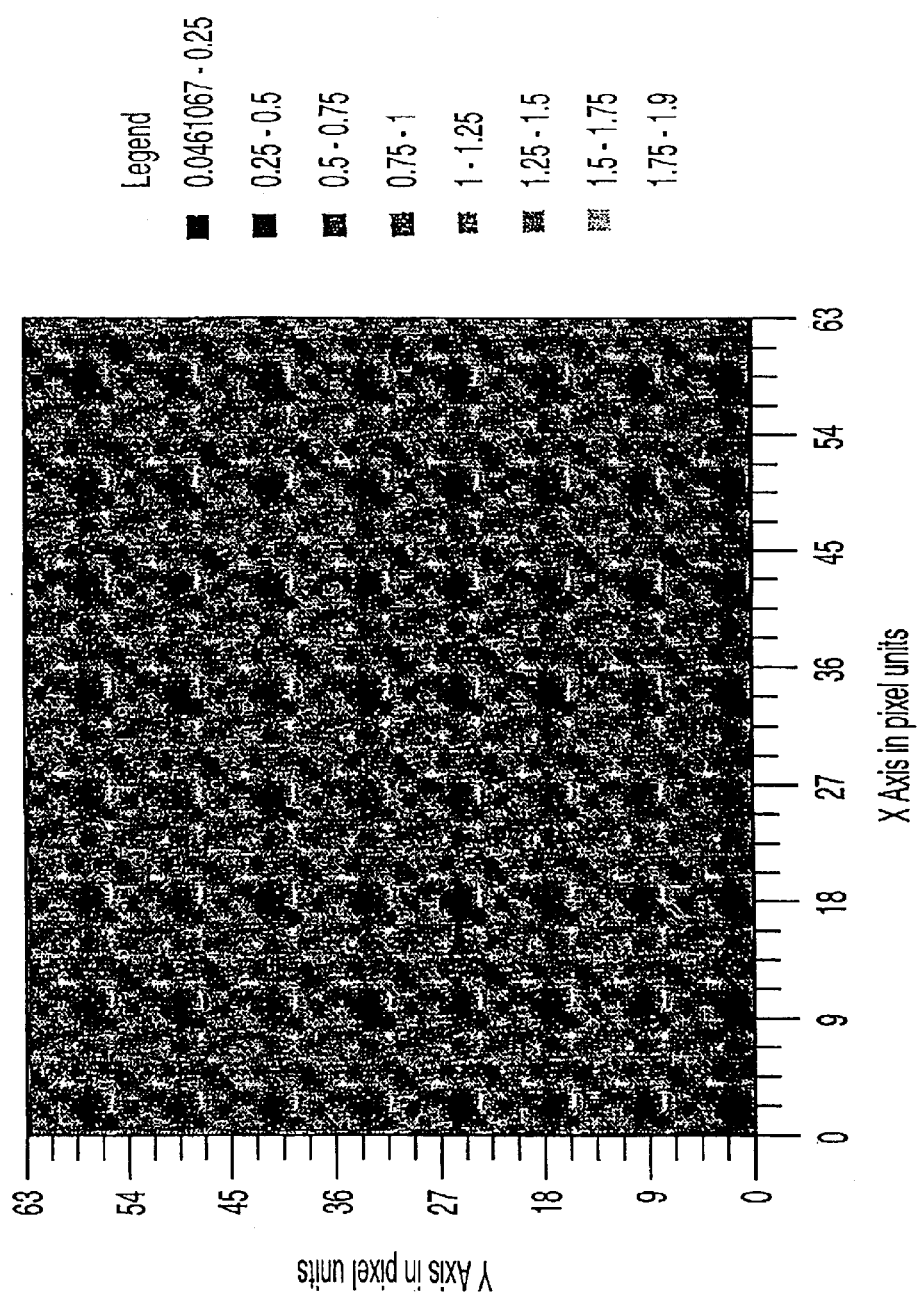
FIGS. 15(A–H) show the results of a computer simulation of the operation of an X-ray microscope built in accordance with the present invention using six stops.
Figure 15B:
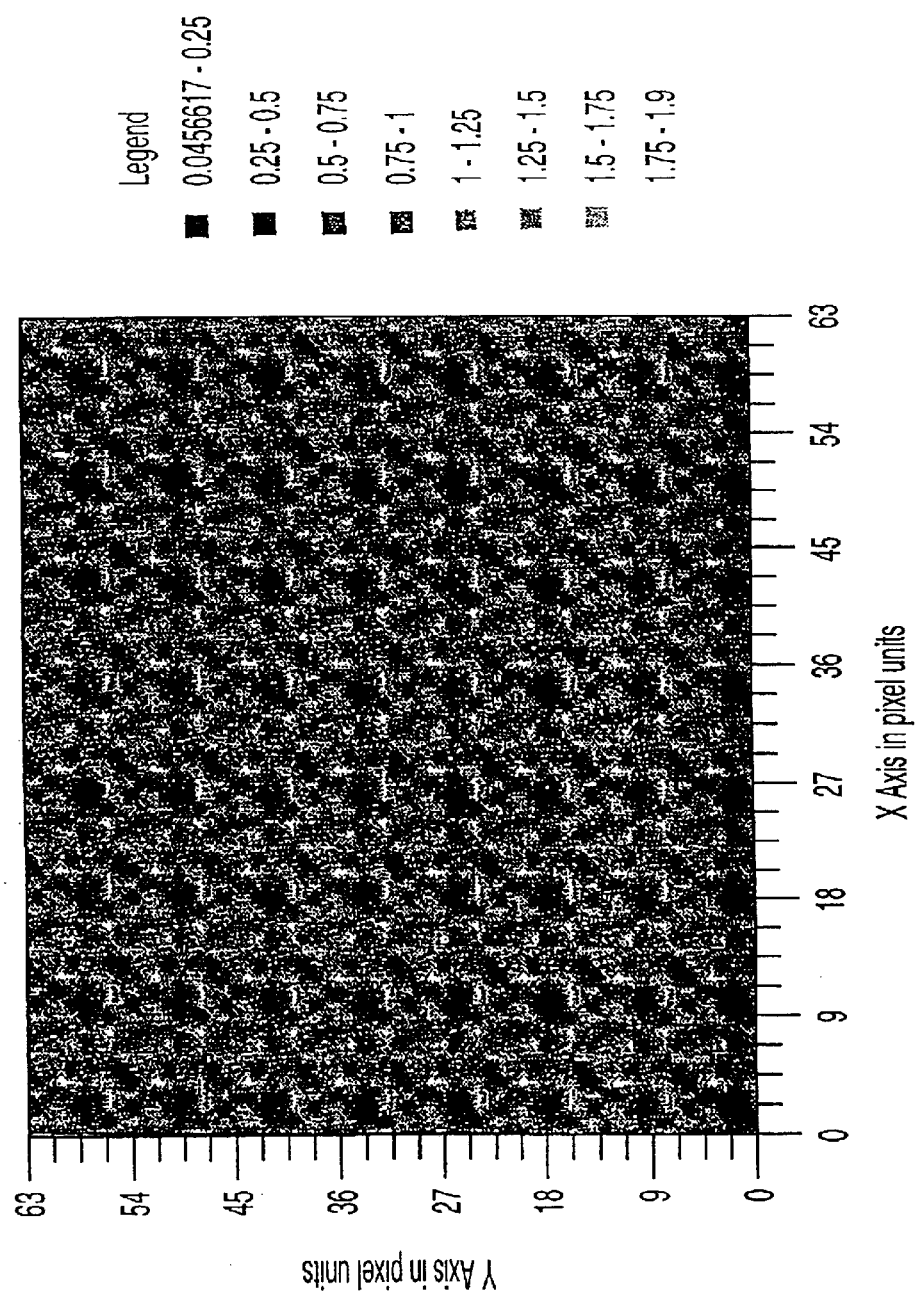
Figure 15C:
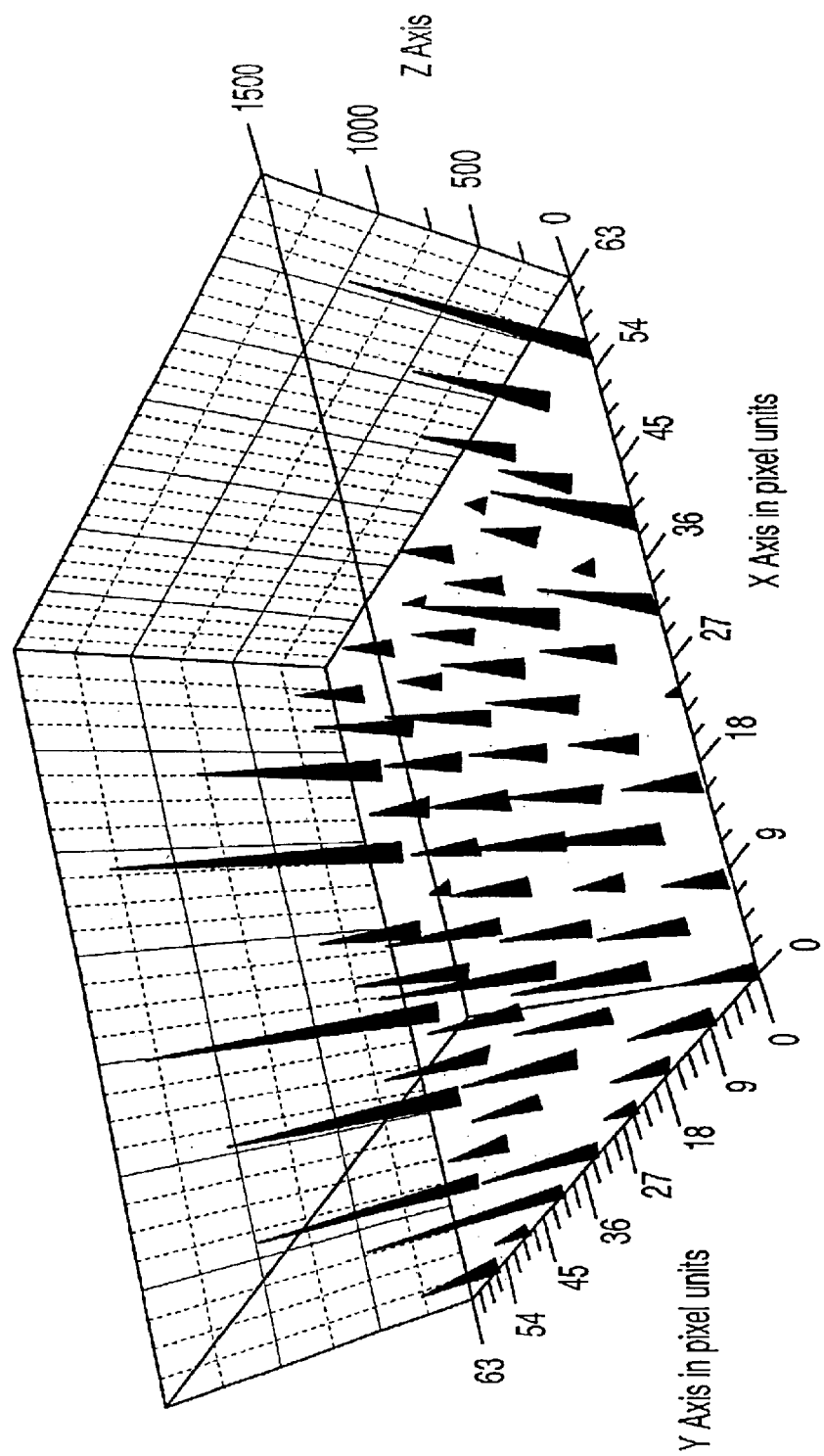
Figure 15D:
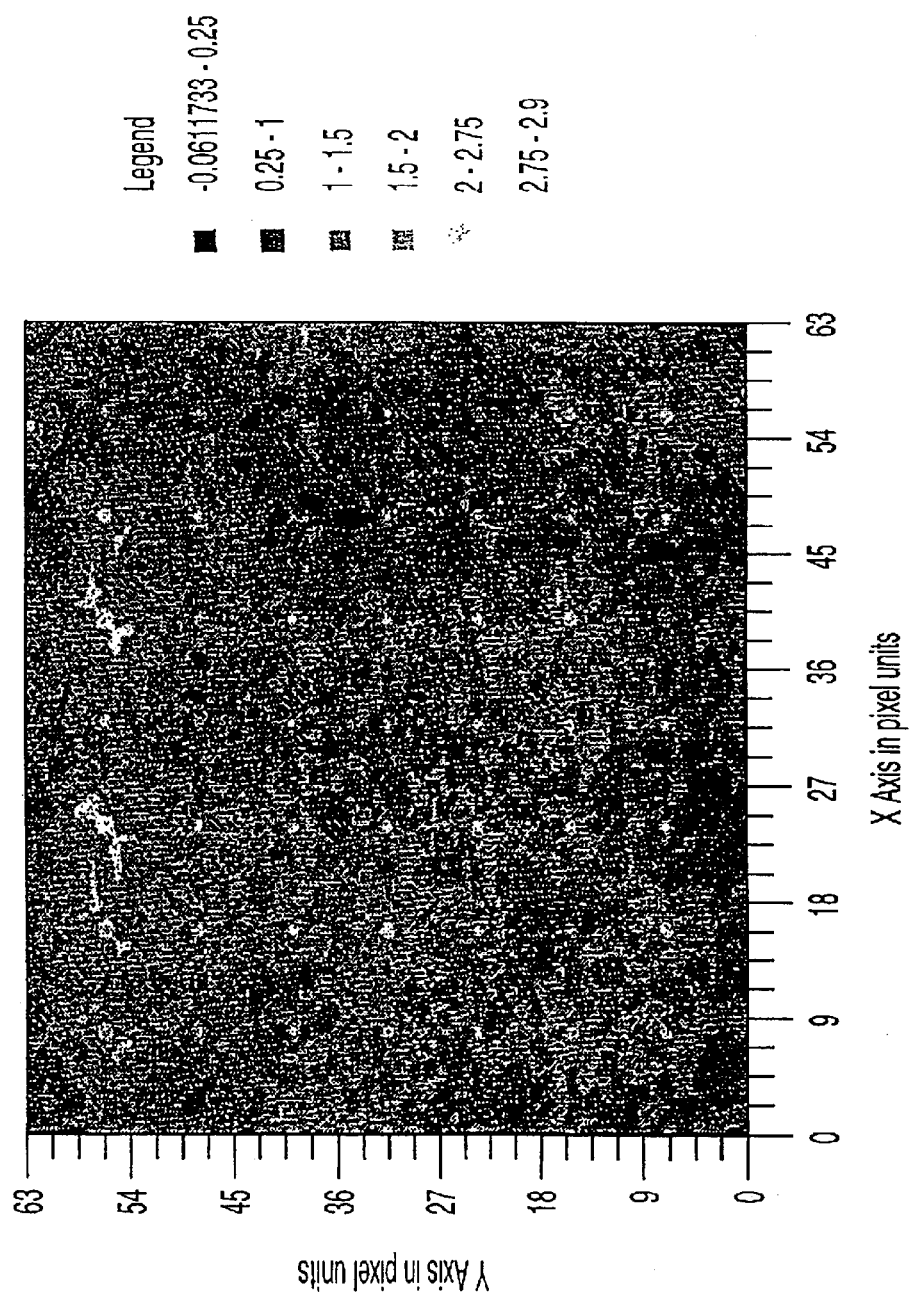
Figure 15E:
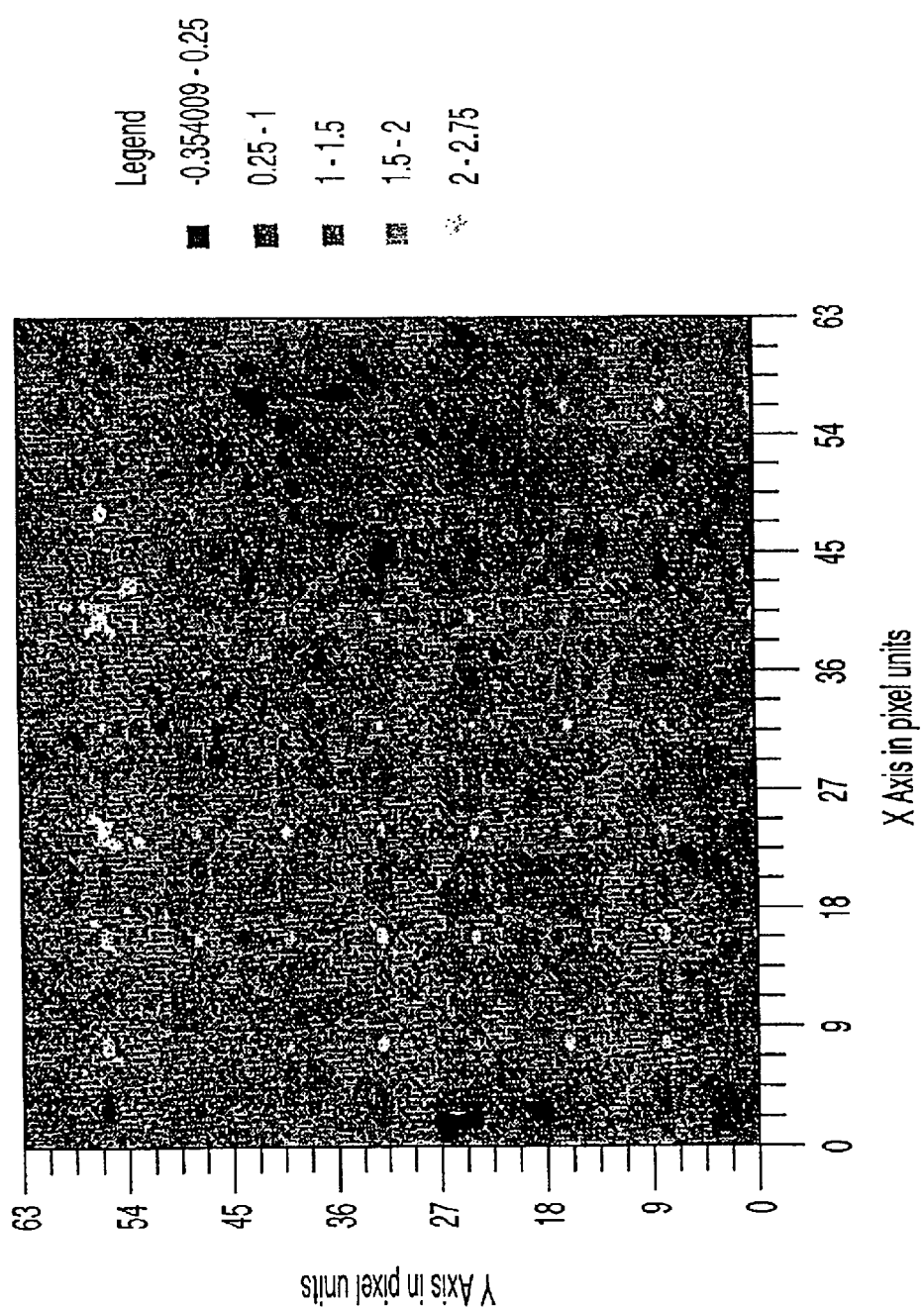
Figure 15F:
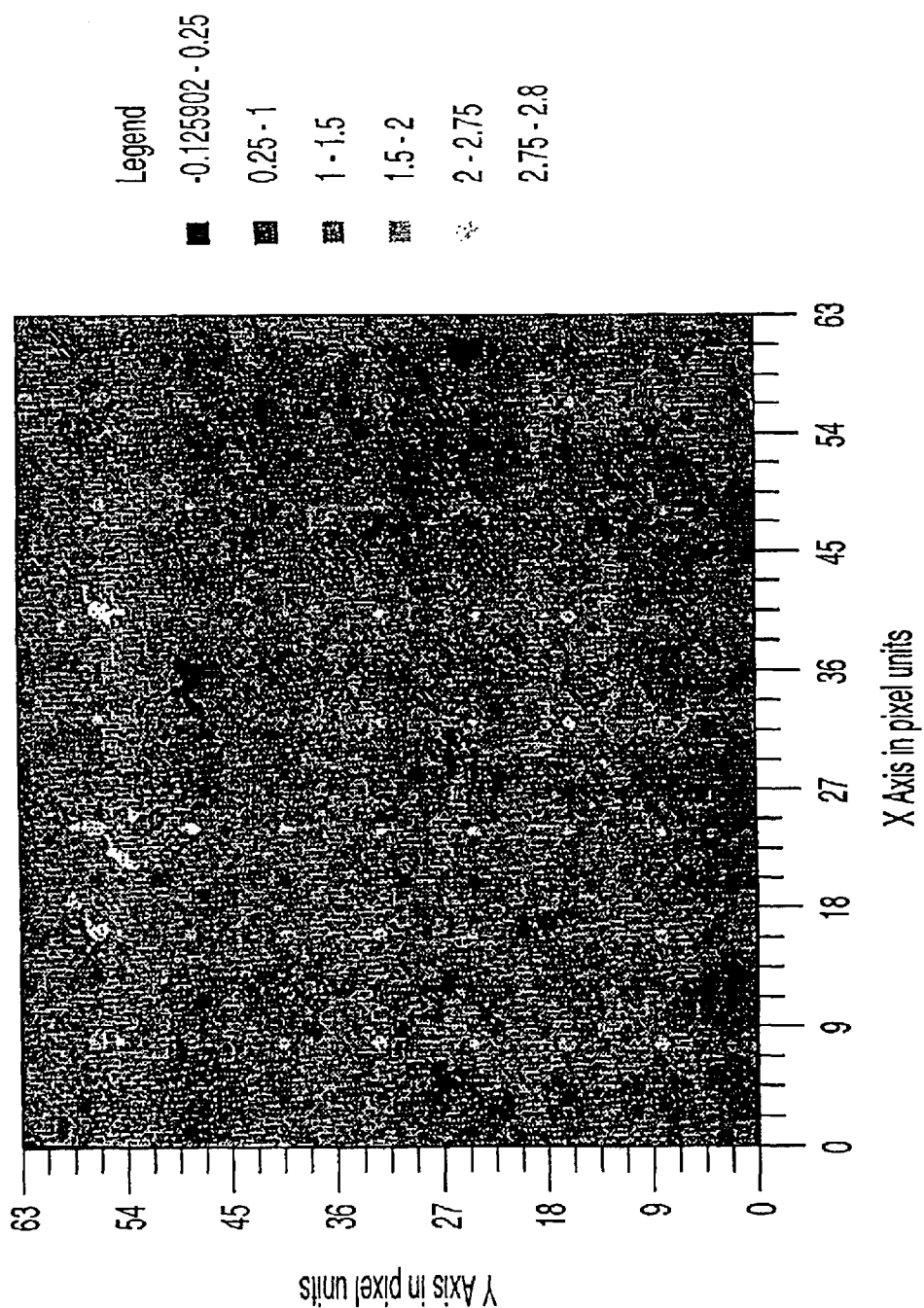
Figure 15G:
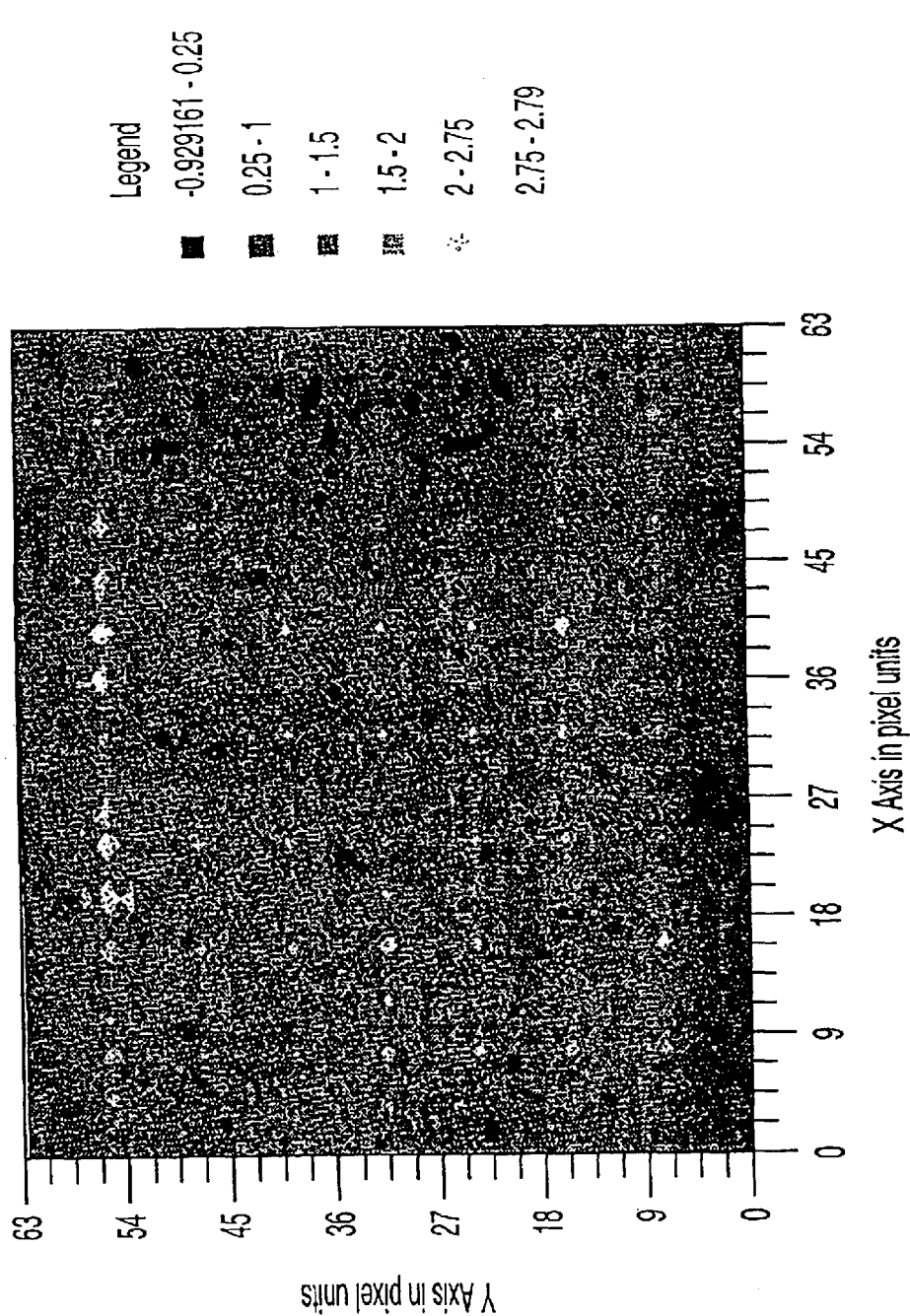
Figure 15H:
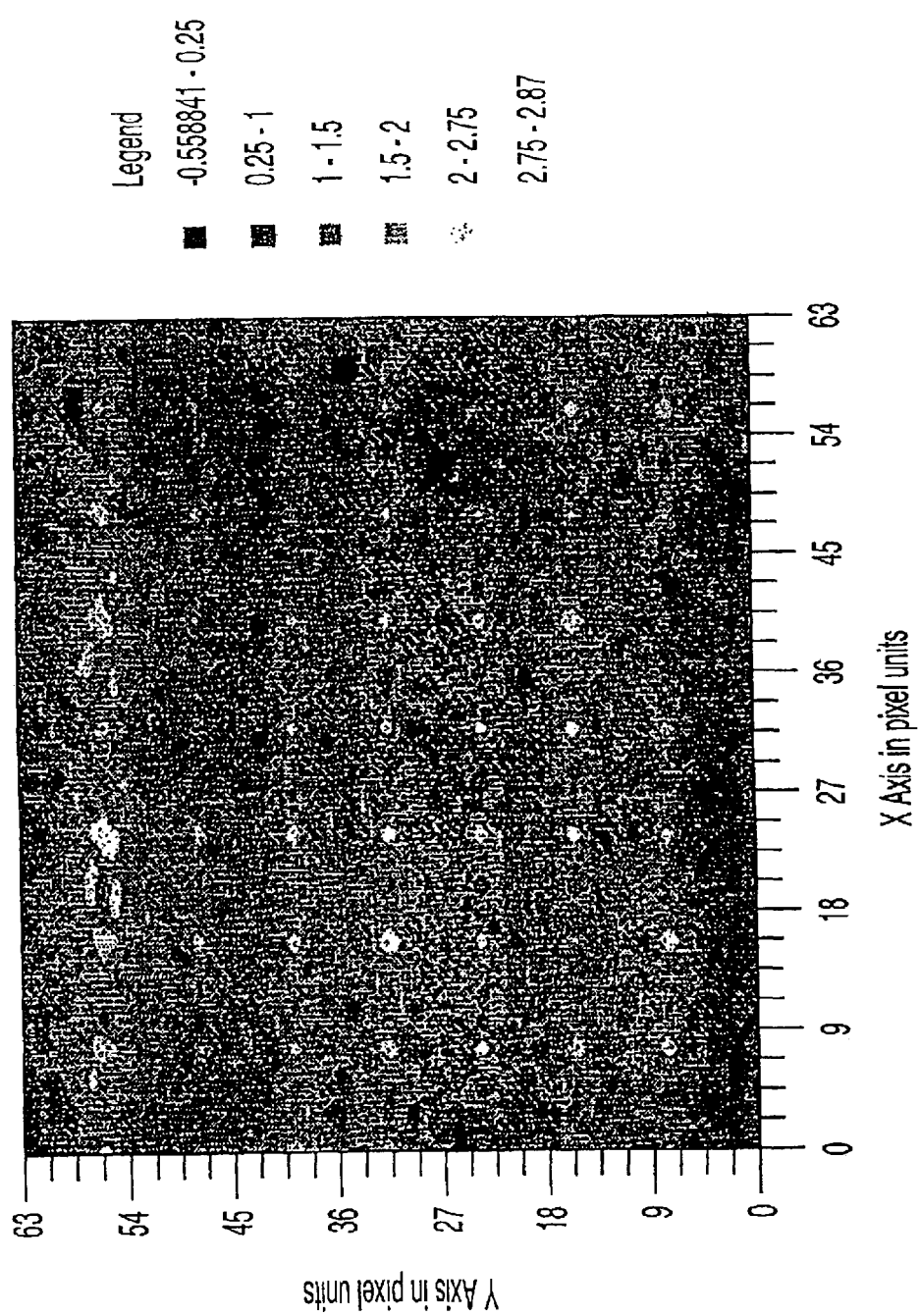

In particular, FIGS. 15A and 15B show the real wave amplitude at a crystal specimen (FIG. 15A) and the recovered wave amplitude at the specimen. The legend on the side of the figures illustrate the wave amplitude distribution in different shades of gray. FIGS. 15C, 15D, 15E, 15F, 15G, and 15H show respectively the 6 phasorgrams, which were used as input of the algorithm to its successful result.

Figure 16:
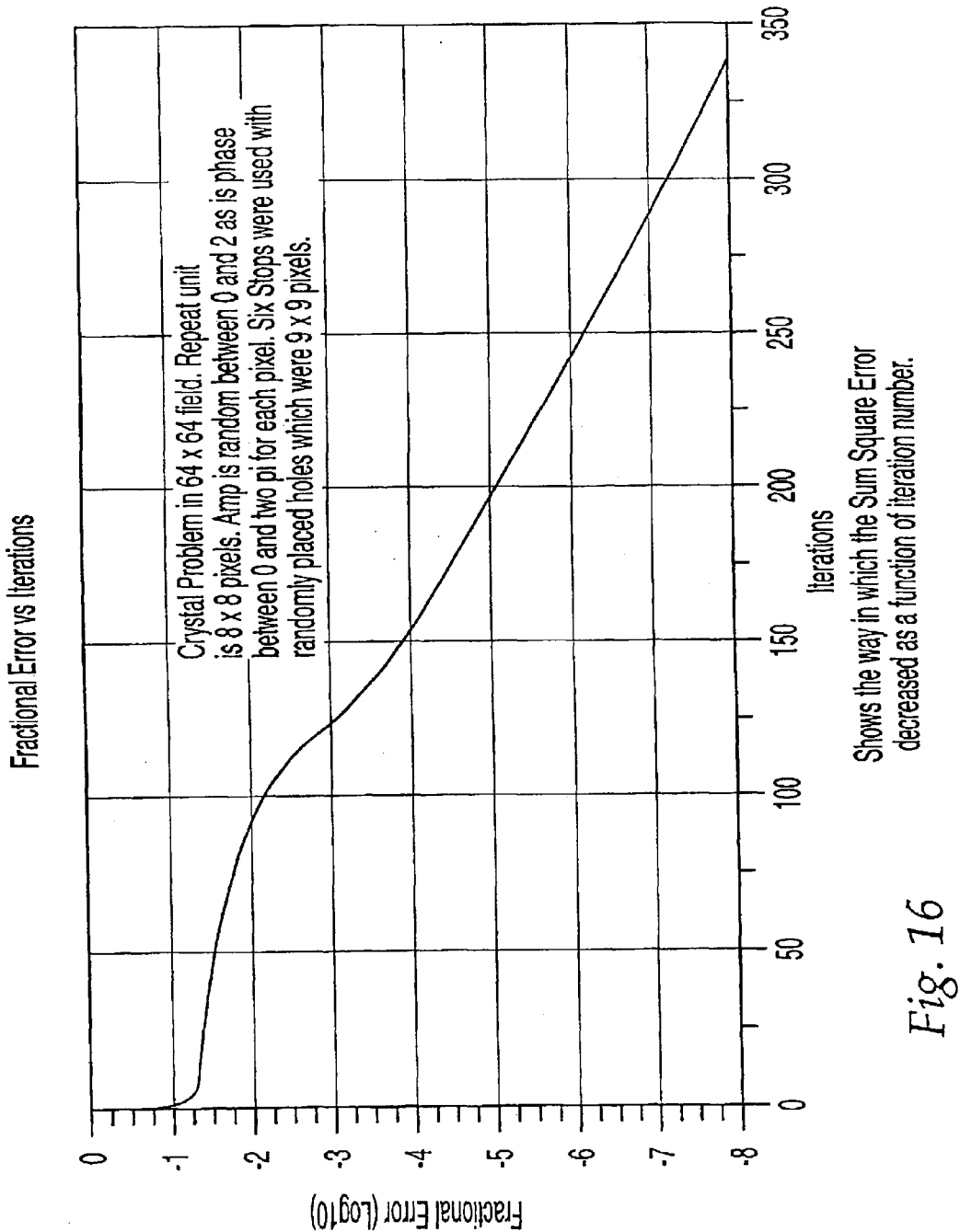
FIG. 16 illustrates the decrease of the sum square error as a function of the number of iterations used in a specific embodiment of the invention.

Finally, FIG. 16 shows the way in which the sum square error decreases as a function of the iteration number. As shown, the Fractional Error in a logarithmic scale is reduced to effectively zero after about 330 iterations.

It should be apparent that while the invention has been described above in the context of reconstructing a complete wave front from intensity measurements, at least some of its utility may reside also in the ability to display or otherwise render the reconstructed wave front to a human observer. In principle, an image of the reconstructed wave front (in the case of visible light applications) could be made to appear as a hologram. The main difference would be that only one source of coherent monochromatic light would be necessary for the display. Information about the reconstructed wave front (amplitude and phase) can be encoded in an article of manufacture, that is then illuminated by the source. More broadly, however, a display in accordance with this invention is can be a printout of the re In a preferred embodiment, "sculpted film" can be used to display the reconstructed wave front. Sculpted film is a new medium that is used to transform complete phase and amplitude information into an analog volumetric hologram (three-dimensional image). This film has two distinct parts.

Phase information of an image is encoded into a medium, which is known as a kinoform. The amplitude information of an image is captured on a photographic emulsion. The kinoform and emulsion are then joined. In this way both the phase information and the amplitude information of an image are united. Thus, when light is shone upon this film, complete information about the image is reproduced, and a three-dimensional image is obtained. In an alternative embodiment, the phase filter provided by Boulder Nonlinear Systems, Inc. can also be used as will be appreciated by those of skill in the art to provide the encoded phase information. The amplitude modulation may still be achieved with film or with future development of an electronically variable optic density medium.

An alternative description of the invention is provided in the attached Appendix A.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An apparatus, comprising:
   (a) a source of collimated radiation for irradiating a specimen of material positioned in a specimen plane;
   (b) a plurality of different stops, each one blocking radiation modulated by the irradiated specimen according to a predetermined blocking pattern;
   (c) one or more sensors capturing for each of the plurality of stops an indication of the intensity distribution of the modulated radiation in a plane that is a conjugate diffraction plane with respect to the specimen plane; and
   (d) a processor recovering phase information of the wave front of the modulated radiation from the captured intensity distributions and the predetermined blocking patterns imparted by the plurality of stops.

2. The apparatus of claim 1, wherein the specimen plane and the conjugate diffraction plane are conjugate planes related by a Fourier transformation.

3. The apparatus of claim 1, wherein the source of radiation is an X-ray source.

4. The apparatus of claim 1, wherein the specimen plane is substantially perpendicular to the radiation.

5. The apparatus of claim 1 further comprising a display for displaying the modulated radiation using the recovered phase information.

6. The apparatus of claim 5, wherein the displayed modulated radiation provides an indication of the structure of the irradiated specimen at a predetermined magnification.

7. The apparatus of claim 6, wherein the radiation is an X-ray radiation.

8. The apparatus of claim 1 further comprising memory for storing the intensity distribution of the modulated radiation in the conjugate diffraction plane for each stop.

9. The apparatus of claim 1, wherein the processor comprises one or more Fast Fourier Transform processors.

10. The apparatus of claim 9, wherein processing of the intensity distribution of the modulated radiation for each stop is done sequentially.

11. The apparatus of claim 9, wherein processing of the intensity distribution of the modulated radiation for each stop is done in parallel.

12. The apparatus of claim 1, wherein the blocking pattern is selected at random.

13. The apparatus of claim 1, wherein the blocking pattern is selected on a pixel-by-pixel basis, where individual pixels correspond to the resolution of said one or more sensors.

14. The apparatus of claim 13, wherein the blocking pattern is selected on a meta-pixel basis, at least some meta-pixels corresponding to a group of two or more pixels.

15. The apparatus of claim 1, wherein one of the stops introduces no blocking of the modulated radiation.

16. The apparatus of claim 13, wherein the processor recovers phase information taking into account the number of stops for which each pixel is blocked.

* * * * *